(12) United States Patent
Shimizu

(10) Patent No.: US 9,030,524 B2
(45) Date of Patent: May 12, 2015

(54) IMAGE GENERATING APPARATUS, SYNTHESIS TABLE GENERATING APPARATUS, AND COMPUTER READABLE STORAGE MEDIUM

(75) Inventor: Seiya Shimizu, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/608,027

(22) Filed: Sep. 10, 2012

(65) Prior Publication Data
US 2013/0002809 A1    Jan. 3, 2013

Related U.S. Application Data

(63) Continuation of application No. PCT/JP2010/055753, filed on Mar. 30, 2010.

(51) Int. Cl.
*H04N 7/00* (2011.01)
*H04N 5/232* (2006.01)
*G06T 3/00* (2006.01)

(52) U.S. Cl.
CPC ...... *H04N 5/23238* (2013.01); *B60R 2300/303* (2013.01); *G06T 3/0062* (2013.01)

(58) Field of Classification Search
None
See application file for complete search history.

(56) References Cited

U.S. PATENT DOCUMENTS

| | | | | |
|---|---|---|---|---|
| 5,850,352 A | * | 12/1998 | Moezzi et al. | 345/419 |
| 6,587,597 B1 | | 7/2003 | Nakao et al. | |
| 7,570,280 B2 | * | 8/2009 | Ozaki | 348/36 |
| 2006/0192853 A1 | * | 8/2006 | Lee | 348/143 |
| 2008/0044061 A1 | | 2/2008 | Hongo | |
| 2009/0256919 A1 | * | 10/2009 | Kobayashi | 348/208.7 |
| 2010/0054628 A1 | * | 3/2010 | Levy et al. | 382/284 |

FOREIGN PATENT DOCUMENTS

| | | |
|---|---|---|
| JP | 11-73489 | 3/1999 |
| JP | 2000-278602 | 10/2000 |
| JP | 2003-115057 | 4/2003 |
| JP | 2005-56295 | 3/2005 |
| JP | 2005-86279 | 3/2005 |
| JP | 2006-54662 | 2/2006 |

(Continued)

OTHER PUBLICATIONS

International Search Report of PCT/JP2010/055753 mailed Apr. 27, 2010.

(Continued)

*Primary Examiner* — Sath V Perungavoor
*Assistant Examiner* — Kate Luo
(74) *Attorney, Agent, or Firm* — Staas & Halsey LLP

(57) ABSTRACT

An image generating apparatus includes an image receiving unit, a projecting unit, and a panoramic image generating unit. The image receiving unit receives camera images captured by a plurality of cameras, the subject of which is common. The projecting unit projects, within each camera image received by the image receiving unit, images which are present below the horizontal line within each camera image on the bottom surface of an infinite hemisphere having a planar bottom surface and projects images which are present above the horizontal line within each camera image on the hemispherical surface of the infinite hemisphere. The panoramic image generating unit generates a panoramic image based on the images projected on the infinite hemisphere by the projecting unit.

5 Claims, 22 Drawing Sheets

(56) References Cited

FOREIGN PATENT DOCUMENTS

| JP | 2008-77628 | 4/2008 |
| JP | 2009-246917 | 10/2009 |

OTHER PUBLICATIONS

S. Ikeda et al., "Generating a Panorama Movie Using an Omnidirectional Multi-camera System", Institute of Electronics, Information and Communication Engineers, 2002.

* cited by examiner

FIG.15

| PIXEL POSITION OF PANORAMIC IMAGE | | PIXEL POSITION OF CAMERA IMAGE | | | | | | | | | | | |
|---|---|---|---|---|---|---|---|---|---|---|---|---|
| | | CAMERA 20 | | | CAMERA 21 | | | CAMERA 22 | | | CAMERA 23 | | |
| qx | qy | EFFECTIVE FLAG | px | py | EFFECTIVE FLAG | px | py | EFFECTIVE FLAG | px | py | EFFECTIVE FLAG | px | py |
| 156 | 63 | 1 | 78 | 456 | 1 | 79 | 312 | 0 | | | 0 | | |
| 156 | 64 | 1 | 78 | 455 | 0 | | | 1 | 46 | 7 | 0 | | |
| ... | ... | ... | ... | ... | ... | ... | ... | ... | ... | ... | ... | ... | ... |

IMAGE GENERATING APPARATUS, SYNTHESIS TABLE GENERATING APPARATUS, AND COMPUTER READABLE STORAGE MEDIUM

CROSS-REFERENCE TO RELATED APPLICATION

This application is a continuation of International Application No. PCT/JP2010/055753, filed on Mar. 30, 2010, the entire contents of which are incorporated herein by reference.

FIELD

The embodiments discussed herein are related to an image generating apparatus, a synthesis table generating apparatus, and a computer readable storage medium.

BACKGROUND

Conventionally, there is an image generating apparatus to generate a panoramic image from images captured by a plurality of cameras. For example, the image generating apparatus acquires surrounding images from a 360-degree camera in which a plurality of cameras is provided to cover all directions of a shooting range. The image generating apparatus projects a plurality of acquired camera images on a virtual spherical screen that centers on the 360-degree camera. The image generating apparatus generates a spherical image by blending pixel values of overlap portions where part of each camera image overlaps each other on the spherical screen. Next, the image generating apparatus converts the spherical image projected on the spherical screen into a planar image by fluoroscopy projection in which the point of sight is the center of a sphere, cylindrical projection in which the medial axis passes the center of a sphere, or polar coordinates projection in which the centers are coincident, and generates a 360-degree panoramic image.

Moreover, there is a technology which reduces influence of parallax on generation of a panoramic image. Parallax is a difference in angle of sight at which a subject is viewed, which is caused due to a difference between positions at which a plurality of cameras is installed. This technology reduces the influence of the parallax by using the fact that "when the distance from the camera to a subject is large enough compared with the distance between cameras, the distance between cameras can be neglected". For example, when the distance from the cameras to the subject is far enough, since the radius of a virtual spherical screen on which camera images are projected can be set to be infinite, a panoramic image is generated while suppressing the influence of the parallax. As for related arts, refer to the following patent documents: Japanese Laid-open Patent Publication No. 2005-056295; Japanese Laid-open Patent Publication No. 2008-77628; Japanese Laid-open Patent Publication No. 2006-054662; and Japanese Laid-open Patent Publication No. 2000-278602, and the following Non-Patent document: S. Ikeda and two others, "Generating a Panorama Movie Using an Omni-directional Multi-camera System", Institute of Electronics, Information and Communication Engineers, 2002.

Incidentally, in the conventionally-known image generating apparatus described above, a panoramic image, in which the overlapping portions of each camera image match each other, is generated when there is no parallax between the camera images. Therefore, in connection with the conventional image generating apparatus, the cameras need to be installed sufficiently adjacent to each other to the extent that the parallax can be neglected, or the cameras need to take an image of only a subject which is sufficiently far from the cameras to the extent that the parallax can be neglected.

Here, it might be useful to generate a panoramic image from camera images captured by a plurality of cameras installed at different positions and provide it to the user. For example, it is considered to be useful at the time lane-changing or parking if camera images are acquired from in-vehicle cameras mounted at the front, rear, left and right side of a vehicle, and a panoramic image is generated from the acquired camera images and provided to the driver. However, the conventional image generating apparatus had a problem of generating a panoramic image giving a sense of unnaturalness when generating a panoramic image from a plurality of camera images with parallaxes because the apparatus double-projects the overlapping portions of each camera image on the spherical screen.

The reason why the conventional image generating apparatus generates the unnatural panoramic image is described referring to FIG. 29 and FIG. 30. FIGS. 29 and 30 are diagrams to describe the problem of the related art. FIG. 29 illustrates an appearance of a vehicle 10 seen from the side, and FIG. 30 illustrates an appearance of the vehicle 10 seen from above. In examples illustrated in FIGS. 29 and 30, the vehicle 10 includes an image generating apparatus mounted thereto. The vehicle 10 also includes a camera 20 mounted at the front side, a camera 21 mounted at the rear side, a camera 22 mounted at the left side, and a camera 23 mounted at the right side. Each of the cameras 20 to 23 captures its own camera image around the vehicle and the image generating apparatus mounted to the vehicle 10 projects the captured camera images on a virtual spherical screen 50. The spherical screen 50 is set, centering on the vehicle 10.

Referring to an example of FIG. 29, a case where a subject 30 is located in the distance is described. The image generating apparatus acquires camera images, in which the subject 30 is a transmitter located in the distance, from the cameras 21 and 22. The image generating apparatus projects an image corresponding to a position "P" within the subject 30, which is captured by the camera 21, on a position "$P_1$" of the spherical screen 50. On the other hand, the image generating apparatus projects an image corresponding to the position "P" within the subject 30, which is captured by the camera 22, on a position "$P_2$" of the spherical screen 50. In other words, the image generating apparatus doubly projects the images corresponding to the position "P" within the subject 30, on the position "$P_1$" and the position "$P_2$". Therefore, the image generating apparatus generates a panoramic image which gives the driver a sense of unnaturalness for the result of converting the doubly projected spherical image into a planar image.

Referring to an example illustrated in FIG. 30, a case where the subject 30 is a nearby object is described. The image generating apparatus acquires camera images, in which the subject 30 is a white line on a road, from the cameras 20 and 23. The image generating apparatus projects an image corresponding to a position "P" within the subject 30, which is captured by the camera 20, on a position "$P_1$" of the spherical screen 50. On the other hand, the image generating apparatus projects an image corresponding to the position "P" within the subject 30, which is captured by the camera 23, on a position "$P_2$" of the spherical screen 50. In other words, the image generating apparatus doubly projects the image corresponding to the position "P" within the subject 30, on the position "$P_1$" and the position "$P_2$". Therefore, the image generating apparatus generates a panoramic image which gives the driver a sense of unnaturalness for the result of converting the doubly projected spherical image into a planar image.

Moreover, even if the conventional image generating apparatus uses the technology which reduces the influence of the parallax, the conventional image generating apparatus generates an unnatural panoramic image from camera images with parallax. This is because the distance between cameras cannot be neglected when the subject exists near the cameras. For example, even if the radius of the spherical screen, onto which the image corresponding to the position "P" within the subject 30 is projected, is set to be infinite, the distance between the position "$P_1$" and the position "$P_2$" on a projection surface are not converge, and as a result, an unnatural panoramic image is generated.

SUMMARY

According to an aspect of an embodiment, an image generating apparatus includes a processor, and a memory, wherein the processor executes: projecting, within each camera image received at the receiving, a certain image that is present below a horizontal line within each of the camera images on a bottom surface of an infinite hemisphere having a planar bottom surface, and projects an image that is present above the horizontal line within each of the camera images on a hemispherical surface of the infinite hemisphere; and generating a panoramic image based on the images projected on the infinite hemisphere at the projecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram illustrating an example of data stored in a synthesis table according to Second Embodiment;

DESCRIPTION OF EMBODIMENTS

Preferred embodiments of the present invention will be explained with reference to accompanying drawings. The technology disclosed by the present application is not limited to the examples which are described below as embodiments of an image generating apparatus, an image generating program, a synthesis table generating apparatus, and a synthesis table generating program. Each embodiment may be suitably combined within the range in which processing contents are not contradictable.

[a] First Embodiment

Figure 1:
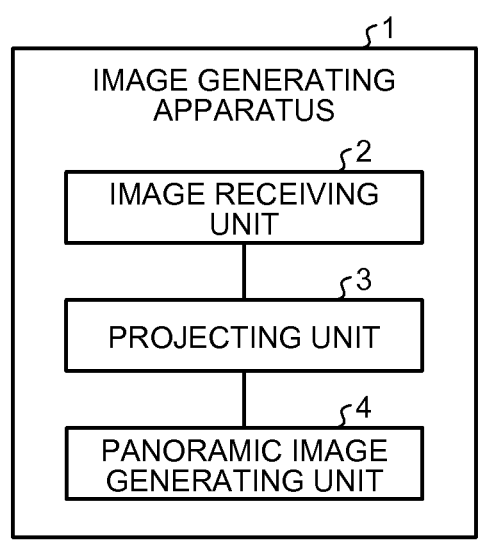
FIG. 1 is a block diagram illustrating the configuration of an image generating apparatus according to First Embodiment.

FIG. 1 is a block diagram illustrating the configuration of an image generating apparatus according to First Embodiment. As illustrated in FIG. 1, an image generating apparatus 1 according to First Embodiment includes an image receiving unit 2, a projecting unit 3, and a panoramic image generating unit 4.

The image receiving unit 2 receives camera images captured by each of a plurality of cameras having a common subject area. The projecting unit 3 projects an image below a horizontal line within each camera image on the bottom surface of an infinite hemisphere having a planar bottom surface and projects an image above the horizontal line within each camera image on the hemispherical surface of the infinite hemisphere, within each camera image received by the image receiving unit 2. The panoramic image generating unit 4 generates a panoramic image based on the images which are projected on the infinite hemisphere by the projecting unit 3.

Figure 2:
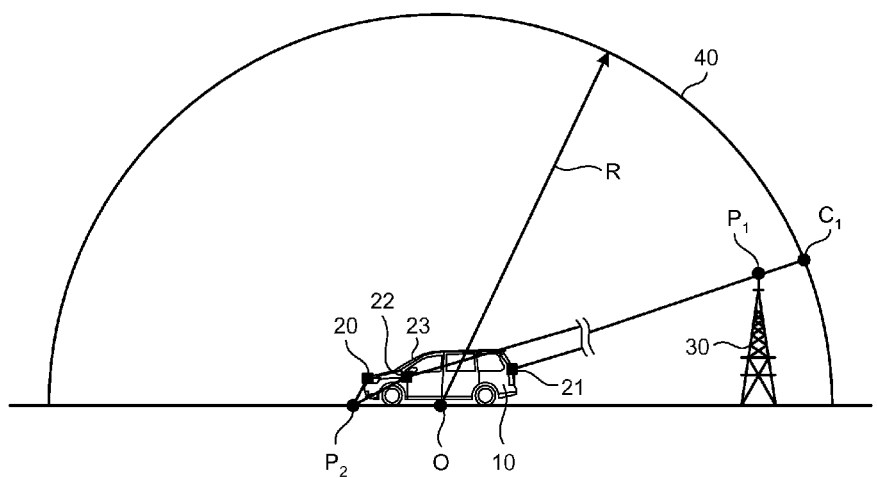
FIG. 2 is a diagram to describe the principle of the image generating apparatus.

The principle of the image generating apparatus 1 is described referring to FIG. 2. FIG. 2 is a diagram to describe the principle of the image generating apparatus. In the example of FIG. 2, the image generating apparatus 1 is assumed to be mounted to a vehicle 10. FIG. 2 illustrates an appearance of the vehicle 10 seen from the left side. The vehicle 10 includes a camera 20 mounted at the front side, a camera 21 mounted at the rear side, a camera 22 mounted at the left side. The vehicle 10 also includes a camera 23 mounted to the right side like the left side. The image generating apparatus 1 mounted to the vehicle 10 captures images of the surroundings of the vehicle with each of the cameras 20 to 23, and projects the captured images on a virtual three-dimensional screen 40. Hereinafter, images captured by the cameras 20 to 23 are referred to as camera images sometimes. The three-dimensional screen 40 is a projection plane of an infinite hemisphere shape, the origin "O" of which is set to a point on the road surface located directly under the center of the vehicle 10, the radius "R" of which is set to be infinite, and the bottom surface of which is set to a plane being in the same height as the load surface.

The reason why the image generating apparatus 1 projects the image, which is above the horizontal line within the camera image, on the hemispherical surface of the infinite hemisphere is that the influence of the parallax on the subject 30 in the distance can be reduced when the image is projected on the hemispherical surface of an infinite hemisphere. In the example illustrated in FIG. 2, the image generating apparatus 1 captures an image of a position "$P_1$" within the subject 30 in the distance with the cameras 21 and 22, and projects the captured image of the position "$P_1$" on the hemispherical surface of the infinite hemisphere. In this case, since the distance from the cameras 20 to 23 to the subject 30 is far enough compared with the distance between the adjacent cameras among the cameras 20 to 23, the distance between adjacent cameras among the cameras 20 to 23 can be neglected. In other words, the image generating apparatus 1 projects both of the image of the position "$P_1$" of the subject 30 which is captured by the camera 22 and the image of the position "$P_1$" of the subject 30 which is captured by the camera 21, on a position "$C_1$" of the hemispherical surface of the infinite hemisphere. Moreover, it is not rare that an image which is above a horizontal line within a camera image includes subjects in the distance, such as sky and buildings. Therefore, the image generating apparatus 1 stochastically reduces the influence of the parallax by projecting the image which is above the horizontal line within the camera image on the hemispherical surface of the infinite hemisphere.

The reason why the image generating apparatus 1 projects the image which is below the horizontal line within the camera image on the bottom surface of the infinite hemisphere is that the influence of the parallax on the subject 30 on the road surface can be reduced when the images are projected on the bottom surface of the infinite hemisphere. In the example illustrated in FIG. 2, in the image generating apparatus 1, an image of a position "$P_2$" on the road surface is captured by the cameras 20 and 22, and the captured images of the position "$P_2$" are projected on the bottom surface of the infinite hemisphere. In this case, since the road surface under the vehicle 10 matches the bottom surface of the infinite hemisphere, the position "$P_2$" is projected at the same position "$P_2$" on the bottom surface of the infinite hemisphere when it is projected on the bottom surface of the infinite hemisphere. In other words, not only when the image of the position "$P_2$" on the road surface which is captured by the camera 20 is projected but also when the image of the position "$P_2$" on the road surface which is captured by the camera 22 is projected, the image generating apparatus 1 projects the images on the same position "$P_2$". Moreover, it is not rare that the images below the horizontal line within the camera images represent roads, objects existing on the roads, etc. Therefore, the image generating apparatus 1 stochastically reduces the influence of the parallax by projecting the images which are below the horizontal line within the camera images on the bottom surface of the infinite hemisphere.

In this way, for each of the plurality of camera images, the image generating apparatus 1 according to First Embodiment projects images, which are above the horizontal line, on the hemispherical surface of the infinite hemisphere, and images, which are below the horizontal line, on the bottom surface of the infinite hemisphere. Next, the image generating apparatus 1 generates a panoramic image from the projected images. With such a projection technology, according to the image generating apparatus 1, it is possible to generate a panoramic image that gives a sense of less unnaturalness.

[b] Second Embodiment

An example of a vehicle periphery monitoring apparatus and an example of a synthesis table generating apparatus according to Second Embodiment will be described. In Second Embodiment, a description is made about a case where the vehicle periphery monitoring apparatus generates a panoramic image using a synthesis table generated by a synthesis table generating apparatus. The vehicle periphery monitoring apparatus is an example of the image generating apparatus of First Embodiment. Hereinbelow, derivation of expressions used by the vehicle periphery monitoring apparatus and the synthesis table generating apparatus is first described, and the configurations, processing, and advantages of the vehicle periphery monitoring apparatus and the synthesis table generating apparatus are then described.

Derivation of Expressions According to Second Embodiment

Figure 3:
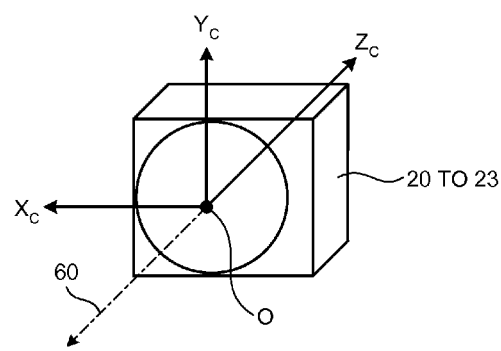
FIG. 3 is a diagram to describe parameters of a camera.
Figure 4:
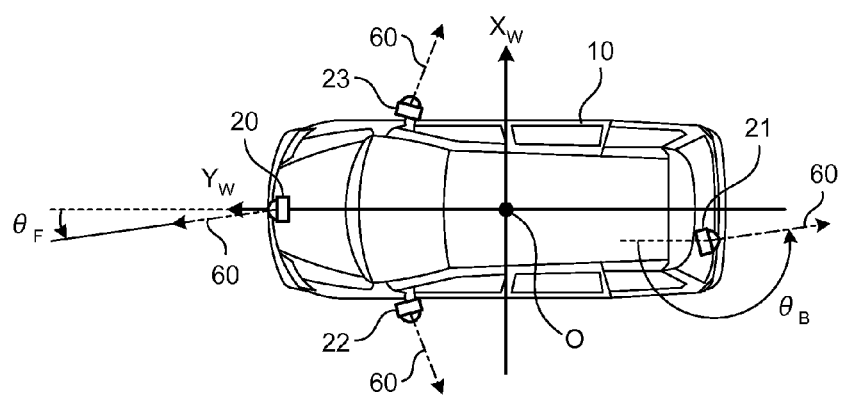
FIG. 4 is a diagram to describe parameters of a camera.
Figure 5:
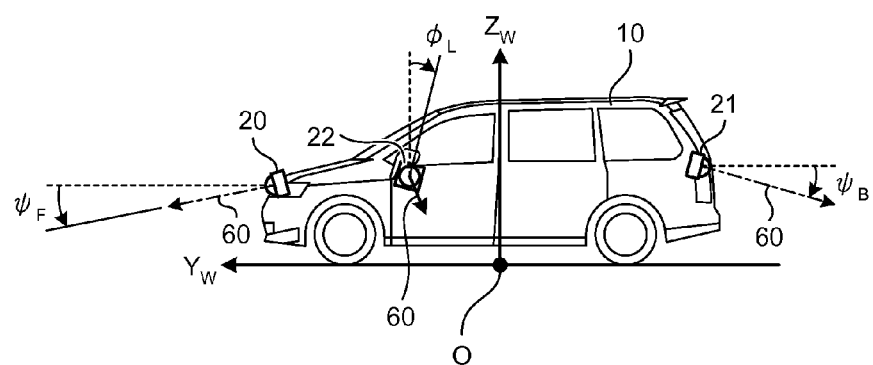
FIG. 5 is a diagram to describe parameters of a camera.

First, parameters of a camera are described. FIGS. 3 to 5 are diagrams to describe the parameters of the camera. FIG. 3 illustrates a relation between an optical axis 60 and a camera coordinate system of the cameras 20 to 23. As illustrated in FIG. 3, in the camera coordinate system, the origin "O" is set to the optical center of the cameras 20 to 23, a direction which is opposite to the optical axis 60 is defined as $Z_c$ axis, a horizontal direction which passes the origin "O" is defined as $X_c$ axis, and a vertical direction which passes the origin "O" is defined as $Y_c$ axis.

FIG. 4 illustrates an appearance of a vehicle 10 seen from above, and FIG. 5 illustrates an appearance of the vehicle 10 seen from one side. As illustrated in FIGS. 4 and 5, the vehicle coordinate system is a coordinate system in which the origin "O" is set to the road surface directly under the center of the vehicle 10, the traveling direction of the vehicle 10 is defined as $Y_w$ axis, a horizontal direction orthogonal to the $Y_w$ axis is defined as $X_w$ axis, and a vertical direction orthogonal to the $Y_w$ axis is defined as $Z_w$ axis. The vehicle coordinate system corresponds to the world coordinate system.

The vehicle 10 includes a camera 20 mounted at the front side, a camera 21 mounted at the back side, a camera 22 mounted at the left side, and a camera 23 mounted at the right side. Parameters of the cameras 20 to 23 mounted to the vehicle 10 include positional parameters (xw, yw, zw) which represent three dimensional coordinates of each camera in the vehicle coordinate system. Moreover, the parameters of the cameras 20 to 23 mounted to the vehicle 10 further include angular parameters (θ, ψ, φ) which represent slops of the camera coordinate systems of the respective cameras with respect to the vehicle coordinate system. A pan angle θ represents an angle by which the optical axis 60 is rotated from the $Y_w$-axis in the $X_w$-$Y_w$ plane. As for the direction of the pan angle θ, the clockwise direction around the $Z_w$-axis is assumed to be a positive direction. For example, an angle formed by the optical axis 60 of the camera 20 and the $Y_w$-axis is assumed to be $θ_F$ in FIG. 4. A depression angle ψ represents an angle at which the optical axis 60 inclines toward the vertical direction from the horizontal direction. As for the direction of the depression angle ψ, the declining direction is assumed to be a positive direction. For example, the angle at which optical axis 60 of the camera 20 inclines downward from the horizontal direction is defined as $ψ_F$ in FIG. 5. A rotational angle φ represents an angle of rotation at which the $Y_c$ axis of each camera rotates about the optical axis 60. As for the direction of the rotational angle φ, the counterclockwise direction of the rotation about the optical axis 60 (the clockwise direction of the rotation about the $Z_c$ axis) are assumed to be a positive direction.

Figure 6:
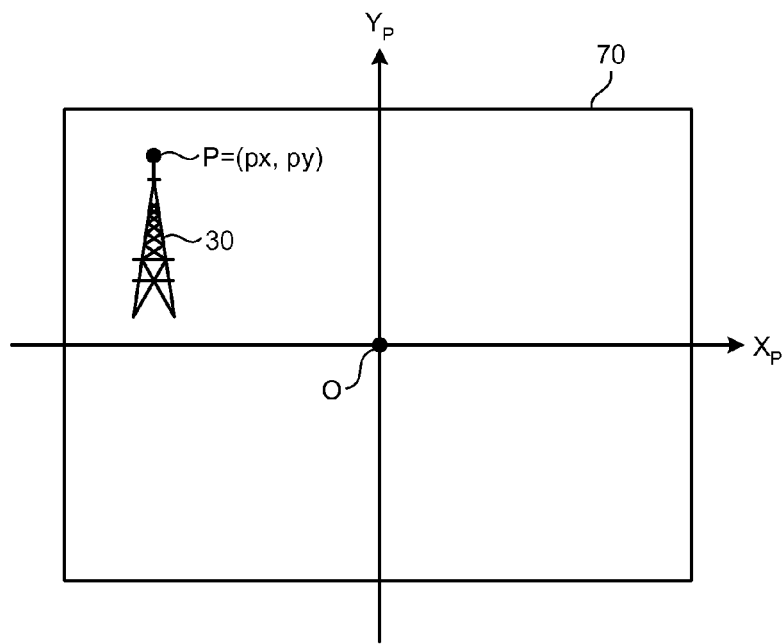
FIG. 6 is a diagram illustrating a relation between a camera image and an incident light vector "Vi"
Figure 7:
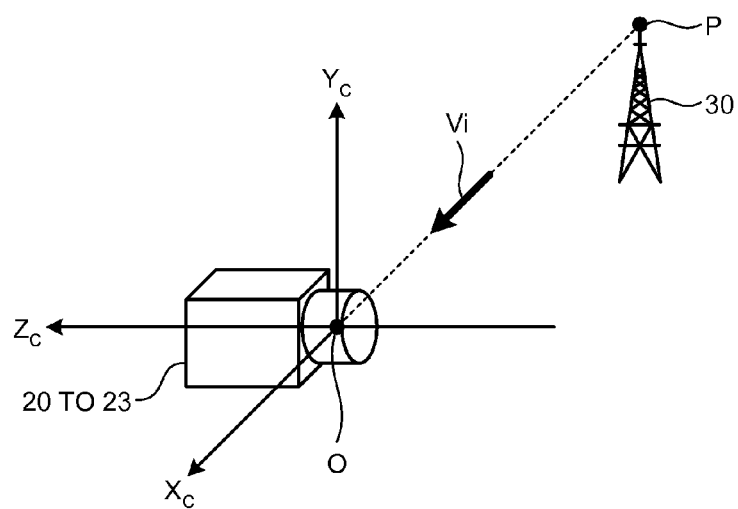
FIG. 7 is a diagram illustrating a relation between a camera image and an incident light vector "Vi"

Next, a relation between a camera image and an incident light vector "Vi" is described. FIGS. 6 and 7 are diagrams illustrating a relation between the camera image and the incident light vector "Vi". FIG. 6 schematically illustrates a camera image 70 captured by any of the cameras 20 to 23. As illustrated in FIG. 6, the camera coordinate system is a coordinate system in which the origin "O" is set to the center of the camera image 70, a horizontal direction which passes the origin "O" is defined as $X_P$ axis, and a vertical direction which passes the origin "O" is defined as $Y_P$ axis. In the camera coordinate system, a position "P" within a subject 30 included in the camera image 70 has coordinates (px, py). The coordinates (px, py) represents a location of a pixel (hereinafter, referred to as pixel position) "P". In other words, the pixel positions "P" are determined for each camera image captured by the cameras.

FIG. 7 schematically illustrates the incident light vector "Vi" in the camera coordinate system. The incident light vector "Vi" is a unit direction vector of a segment that connects the position "P" of the subject 30 and the optical center of the cameras 20 to 23. As for the direction of the incident light vector Vi, a direction directed from the position "P" to the optical center is assumed to be a positive direction. When a map is assumed to be "T", Expression (1) presented below is established between the coordinates of the position "P" in the camera image coordinate system, and the incident light vector "Vi". The map "T" is a value given to each camera based on the parameters of the camera and the distortion of a lens.

$$P = T(Vi) \quad (1)$$

Figure 8:
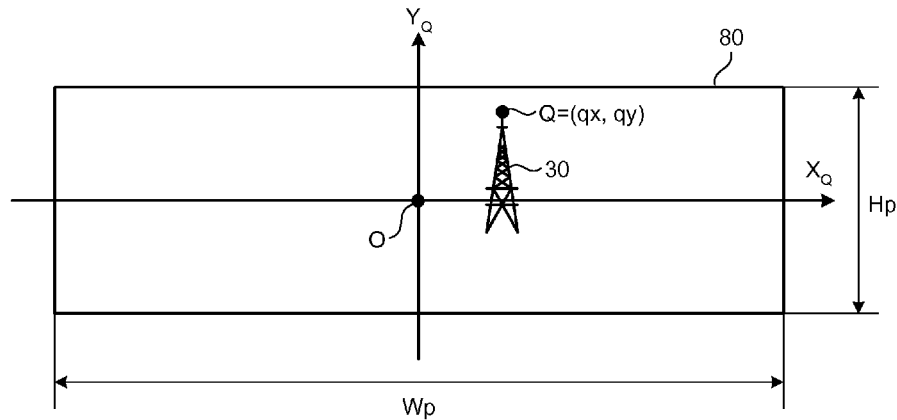
FIG. 8 is a diagram illustrating a relation between a panoramic image and an incident light vector "Vp(Q)"
Figure 9:
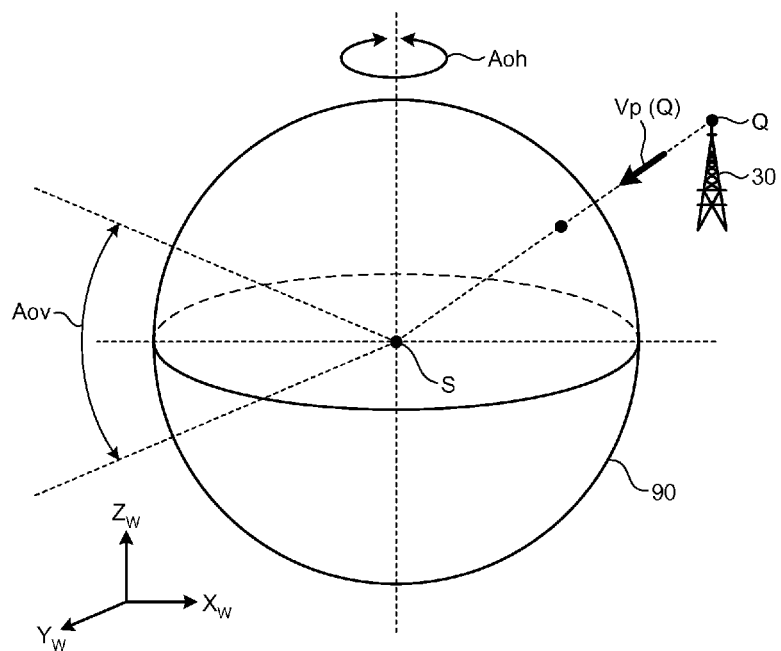
FIG. 9 is a diagram illustrating a relation between a panoramic image and an incident light vector "Vp(Q)"
Figure 10:
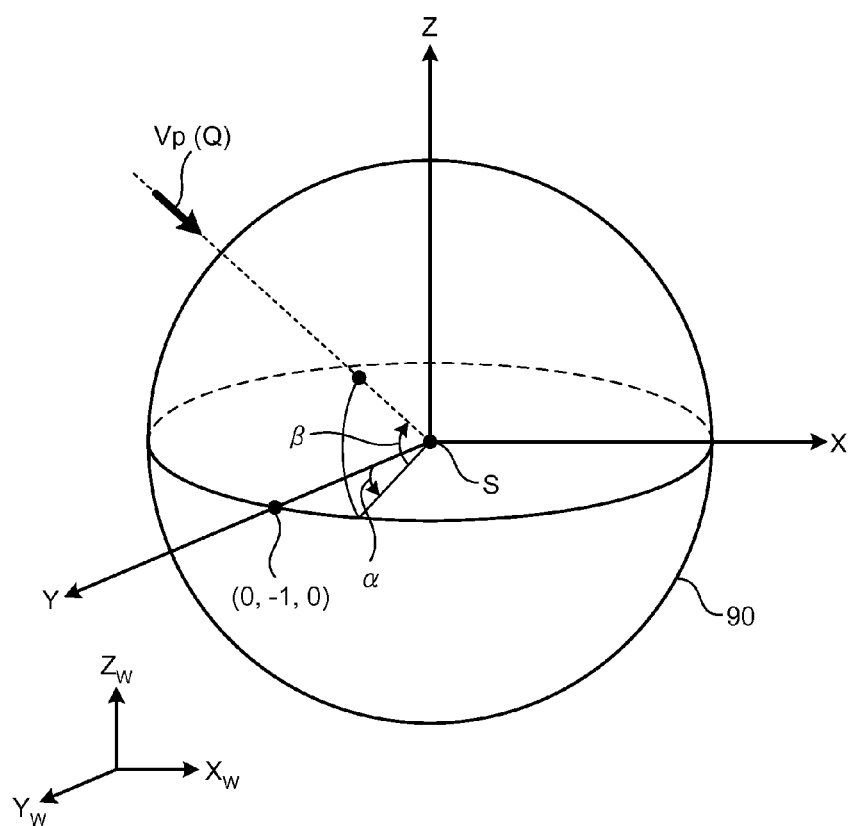
FIG. 10 is a diagram illustrating a relation between a panoramic image and an incident light vector "Vp(Q)"

Next, a relation between a panoramic image 80 and a spherical screen 90 is described. Here, the spherical screen 90 is a virtual sphere in which the center "S" of a sphere is set to the center of the vehicle in the vehicle coordinate system, and the radius is assumed to be "1". Second Embodiment is described in connection with a case where a projection image projected on a three-dimensional screen 40 to be described later is converted into a planar image by polar coordinates projection. FIGS. 8 to 10 are diagrams illustrating a relation between a panoramic image and an incident light vector "Vp(Q)". FIG. 8 schematically illustrates a panoramic image 80 generated by the vehicle periphery monitoring apparatus. As illustrated in FIG. 8, the panoramic image coordinate system is a coordinate system in which the origin "O" is set to the center of the panoramic image 80, a horizontal direction that passes the origin "O" is defined as $X_Q$ axis, and a vertical direction that passes the origin "O" is defined as $Y_Q$ axis. The panoramic image 80 includes a plurality of pixels in which the number of pixels in a $X_Q$-axis direction is "Wp" and the number of pixels in a $Y_Q$-axis direction is "Hp". A position "Q" of the subject 30 included in the panoramic image 80 has coordinates (qx, qy) in the panoramic image coordinate system. This coordinates (qx, qy) is referred to as a pixel position "Q". The position "Q" included in the panoramic image 80 is a position that corresponds to the position "P" included in the camera image 70. Although Second Embodiment describes the case of conversion into a planar image using the polar coordinates projection, the present example is not limited thereto. For example, conversion into a planar image may be carried out using the fluoroscopy projection or the cylindrical projection.

FIG. 9 schematically illustrates a spherical screen 90 used in the polar coordinates projection. The direction of the latitude of the spherical screen 90 corresponds to the $Y_Q$-axis direction of the panoramic image 80 and the direction of the longitude of the spherical screen 90 corresponds to the $X_Q$-axis direction of the panoramic image 80. The area within a horizontal viewing angle of "Aoh" degrees and a vertical viewing angle of "Aov" degrees in the spherical screen 90 covers a "Wp×Hp" number pixels of the panoramic image 80 illustrated in FIG. 8. At this time, the angular resolutions per pixel of the panoramic image 80 become "Aoh/Wp" degrees and "Aov/Hp" degrees. The incident light vector "Vp(Q)" is a unit direction vector of a segment that connects the position "Q" of the subject 30 and the center "S" of the spherical screen 90. As for the direction of the incident light vector "Vp(Q)", a direction directed from the position "Q" to the center "S" is assumed to be a positive direction. The center "S" of the spherical screen 90 is not limited to the center of the vehicle, but may be located at any arbitrary point. For example, the center "S" of the spherical screen 90 may be set to the position of the driver's eye line when the driver gets on the vehicle.

FIG. 10 illustrates a derivation process of expressions to calculate the incident light vector "Vp(Q)". FIG. 10 illustrates a spherical screen 90 the same as that in FIG. 9 for the vehicle coordinate system. In FIG. 10, a straight line starting from the center "S" of the spherical screen 90 and being parallel to the $X_w$ axis is assumed to be a straight line "Y", and a straight line starting from the center "S" and being parallel to the $Z_w$ axis is assumed to be a straight line "Z". The incident light vector "Vp(Q)" is a direction vector obtained by rotating a unit direction vector (0, −1, 0), which is directed from the straight line "Y" to the center "S", vertically by "β" degree and horizontally by "a" degrees. In other words, the direction vector obtained by vertically rotating the unit direction vector (0, −1, 0) by the "β" degrees is calculated by Expression (2) presented below. A direction vector obtained by horizontally rotating the direction vector calculated by Expression (2) by an amount of "α" degrees is calculated by Expression (3) presented below.

$$\begin{bmatrix} 1 & 0 & 0 \\ 0 & \cos\beta & -\sin\beta \\ 0 & \sin\beta & \cos\beta \end{bmatrix} \begin{bmatrix} 0 \\ -1 \\ 0 \end{bmatrix} = \begin{bmatrix} 0 \\ -\cos\beta \\ -\sin\beta \end{bmatrix} \quad (2)$$

-continued $$\begin{bmatrix} \cos\alpha & -\sin\alpha & 0 \\ \sin\alpha & \cos\alpha & 0 \\ 0 & 0 & 1 \end{bmatrix} \begin{bmatrix} 0 \\ -\cos\beta \\ -\sin\beta \end{bmatrix} = \begin{bmatrix} \sin\alpha\cos\beta \\ -\cos\alpha\cos\beta \\ -\sin\beta \end{bmatrix} \quad (3)$$

Therefore, the incident light vector "Vp(Q)" is represented by Expression (4) presented below. The angles "α" and "β" in Expression (4) can be expressed by parameters of a panoramic image coordinate system by using the angular resolutions per pixel. In other words, the angle "α" can be represented by Expression (5) and the angle "β" can be represented by Expression (6).

$$Vp(Q) = \begin{bmatrix} \sin\alpha\cos\beta \\ -\cos\alpha\cos\beta \\ -\sin\beta \end{bmatrix} \quad (4)$$

$$\alpha = -\frac{Aoh}{Wp} \times qx \quad (5)$$

$$\beta = -\frac{Aov}{Hp} \times qy \quad (6)$$

Figure 11:
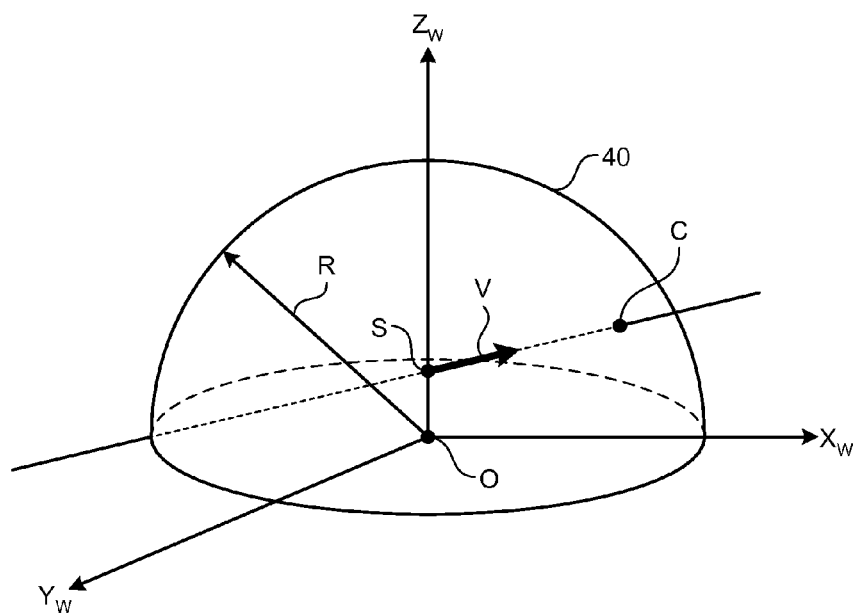
FIG. 11 is a diagram illustrating a relation between an incident light vector "Vp(Q)" and a three-dimensional screen.
Figure 12:
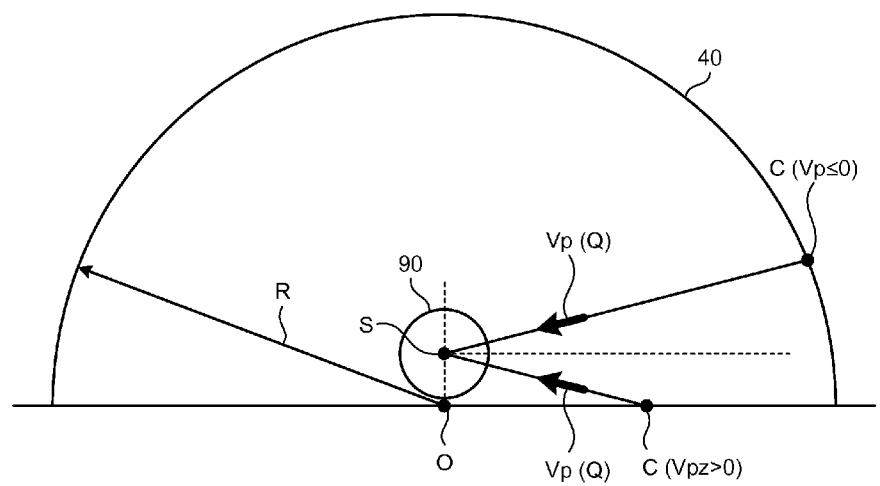
FIG. 12 is a diagram illustrating a relation between an incident light vector "Vp(Q)" and a three-dimensional screen.

Next, a relation between the incident light vector "Vp(Q)" and the three-dimensional screen 40 is described. FIGS. 11 and 12 are diagrams illustrating a relation between the incident light vector "Vp(Q)" and the three-dimensional screen. The three-dimensional screen 40 is an infinite hemisphere where the center of the bottom surface is set as the origin "O" of the vehicle coordinate system and the radius "R" is infinite. The intersection of the straight line that extends in a direction opposite to that of the incident light vector "Vp(Q)" calculated by Expression (4), and the three-dimensional screen 40 is assumed to be a position "C".

FIG. 11 is a diagram to describe a process of deriving expressions used to calculate the position "C". FIG. 11 illustrates the three-dimensional screen 40 in a vehicle coordinate system. In general, a line equation with a slope "V=(Vx, Vy, Vz)" which passes a position "S=(Sx, Sy, Sz)" is represented by Expression (7) presented below when a constant "k" is used. Moreover, a line equation for each component of Expression (7) is represented by Expression (8) to (10) presented below.

$$\frac{x - S_x}{V_x} = \frac{y - S_y}{V_y} = \frac{z - S_z}{V_z} = k \quad (7)$$

$$x = kV_x + S_x \quad (8)$$

$$y = kV_y + S_y \quad (9)$$

$$Z = kV_z + S_z \quad (10)$$

When the position "C" exists on the hemispherical surface of the three-dimensional screen 40, Expression (12) presented below is calculated by simultaneous equations of a sphere equation represented by Expression (8) and Expressions (8) to (10).

$$x^2 + y^2 + z^2 = R^2 \quad (11)$$

$$\frac{V_x^2 + V_y^2 + V_z^2}{R^2} k^2 + 2 \frac{V_x S_x + V_y S_y + V_z S_z}{R^2} k + \frac{S_x^2 + S_y^2 + S_z^2}{R^2} - 1 = 0 \quad (12)$$

Continuously, when the following Expressions (13) to (15) are substituted, Expression (12) is transformed into Expression (16) presented below.

$$a = \frac{V_x^2 + V_y^2 + V_z^2}{R^2} \quad (13)$$

$$b = \frac{V_x S_x + V_y S_y + V_z S_z}{R^2} \quad (14)$$

$$c = \frac{S_x^2 + S_y^2 + S_z^2}{R^2} - 1 \quad (15)$$

$$ak^2 + 2bk + c = 0 \quad (16)$$

Next, the constant "k" is represented by Expression (17) presented below when the quadratic formula is used for Expression (16). Since the position "C" exists in the direction of a direction vector "V", the constant "k" is represented by Expression (18) presented below.

$$k = \frac{-b \pm \sqrt{b^2 - ac}}{a} \quad (17)$$

$$k = \frac{-b + \sqrt{b^2 - ac}}{a} \quad (18)$$

Moreover, since "z=0" in Expression (10) when the position "C" exists on the bottom surface of the three-dimensional screen 40, the constant "k" is represented by Expression (19) presented below.

$$k = \frac{S_z}{V_z} \quad (19)$$

FIG. 12 illustrates an appearance of the spherical screen 90 and the three-dimensional screen 40 viewed from the side. When FIG. 12 is applied to the vehicle coordinate system, a point on the road located directly under the center of the vehicle 10 is the origin "O", and a horizontal straight line that passes the origin "O" is on "$Z_w$=0 plane." The center "S" has coordinates (0, 0, sz). The position "C" exists on the bottom surface of the three-dimensional screen 40 when a z-component of the incident light vector "Vp(Q)=(Vpx, Vpy, Vpz)" is positive "Vpz>0". Moreover, the position "C" exists on the hemispherical surface of the three-dimensional screen 40 when the z-component is negative "Vpz≤0".

When the center "S=(0, 0, sz)" and the incident light vector "Vp(Q)=(Vpx, Vpy, Vpz)" are substituted in Expressions (8) to (10) calculated in FIG. 11, the position "C=(Cx, Cy, Cz)" is represented by Expression (20) presented below. Since the incident light vector "Vp(Q)" calculated by Expression (4) is a vector obtained by reversing the unit direction vector "V" illustrated in FIG. 11, the vector is substituted by changing the sign of each component. Moreover, the constant "k" of Expression (20) is obtained by substituting the center "S=(0, 0, sz)" and the incident light vector "Vp(Q)=(Vpx, Vpy, Vpz)" in Expressions (13) to (15) and Expression (19) calculated in FIG. 11. In other words, the constant "k" of Expression (20) is represented by Expression (21) derived from Expression (19) for "Vpz>0", and represented by Expression (22) derived from Expression (18) for "Vpz≤0". The constant "a" of Expression (22) is represented by the following Expression (23) derived from Expression (13). The constant "b" of Expression (22) is represented by the following Expression (24) derived from Expression (14). The constant "c" of Expression (22) is represented by the following Expression (25) derived from Expression (15).

$$C = S - k \times Vp(Q) \quad (20)$$

$$k = \frac{sz}{Vpz} \quad (21)$$

$$k = \frac{-b + \sqrt{b^2 - ac}}{a} \quad (22)$$

$$a = \frac{Vpx^2 + Vpy^2 + Vpz^2}{R^2} \quad (23)$$

$$b = \frac{-Vpz \times sz}{R^2} \quad (24)$$

$$c = \frac{sz^2}{R^2} - 1 \quad (25)$$

Figure 13:
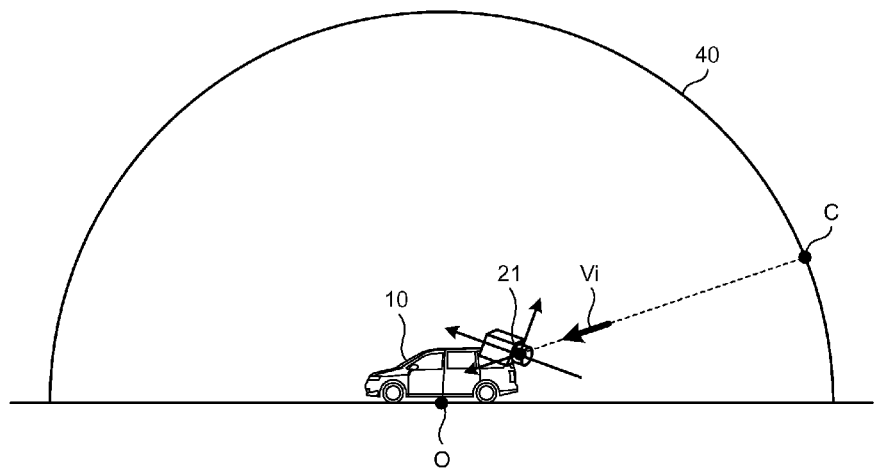
FIG. 13 is a diagram illustrating a relation between a three-dimensional screen and a camera image.

Next, a relation between a three-dimensional screen and a camera image is described. FIG. 13 is a diagram illustrating a relation between the three-dimensional screen and the camera image. FIG. 13 illustrates an appearance of the three-dimensional screen 40 and the vehicle 10 viewed from the side. In FIG. 13, a position "C=(Cx, Cy, Cz)" in the vehicle coordinate system, which is calculated by Expression (20), is converted into a position "C*=(C*x, C*y, C*z)" in the camera coordinate system. The position "C*" corresponds to a position located when the position "C" is displaced in parallel by the amount of the positional parameters (xw, yw, zw) of the camera and the position "C" is rotated by the amount of the angular parameters (θ, ψ, φ) of the camera. That is, the position "C*" is represented by Expression (26) presented below. "m11" to "m33" of Expression (26) are represented by Expression (27) to Expression (35) presented below.

$$\begin{bmatrix} C^*x \\ C^*y \\ C^*z \\ 1 \end{bmatrix} = \begin{bmatrix} m11 & m21 & m31 & -m11 \times xw - m12 \times yw - m12 \times zw \\ m12 & m22 & m32 & -m21 \times xw - m22 \times yw - m22 \times zw \\ m13 & m23 & m33 & -m31 \times xw - m32 \times yw - m32 \times zw \\ 0 & 0 & 0 & 1 \end{bmatrix} \begin{bmatrix} Cx \\ Cy \\ Cz \\ 1 \end{bmatrix} \quad (26)$$

$$m11 = \cos\phi \times \cos\theta - \sin\phi \times \sin\psi \times \sin\theta \quad (27)$$

$$m12 = \cos\phi \times \sin\theta + \sin\phi \times \sin\psi \times \cos\theta \quad (28)$$

$$m13 = \sin\phi \times \cos\psi \quad (29)$$

$$m21 = -\sin\phi \times \cos\theta - \cos\phi \times \sin\psi \times \sin\theta \quad (30)$$

$$m22 = -\sin\phi \times \sin\theta + \cos\phi \times \sin\psi \times \cos\theta \quad (31)$$

$$m23 = \cos\phi \times \cos\psi \quad (32)$$

$$m31 = \cos\psi \times \sin\theta \quad (33)$$

$$m32 = -\cos\psi \times \cos\theta \quad (34)$$

$$m33 = \sin\psi \quad (35)$$

Next, the incident light vector "Vi" in the camera coordinate system is calculated from the position "C*" obtained by Expression (26). The incident light vector "Vi" is represented by Expression (36) presented below by using the function "Unit( )". The function "Unit( )" is a function that converts an arbitrary vector into a coordinate vector. Moreover, since the incident light vector "Vi" is reversed to the vector of the position "C*", it is represented by the same expression with opposite signs.

$$Vi = \text{Unit}(C^*) \quad (36)$$

The incident light vector "Vi" calculated by Expression (36) is converted into the position "P" in the camera image coordinate system by using the above-mentioned Expression (1). That is, a synthesis table generating apparatus 100 calculates a correspondence relation between the pixel position "Q" of the panoramic image 80 generated from a plurality of camera images 70 and the pixel position "P" of the camera image 70 by using Expressions (1) to (36) presented above.

Configuration of Second Embodiment

Figure 14:
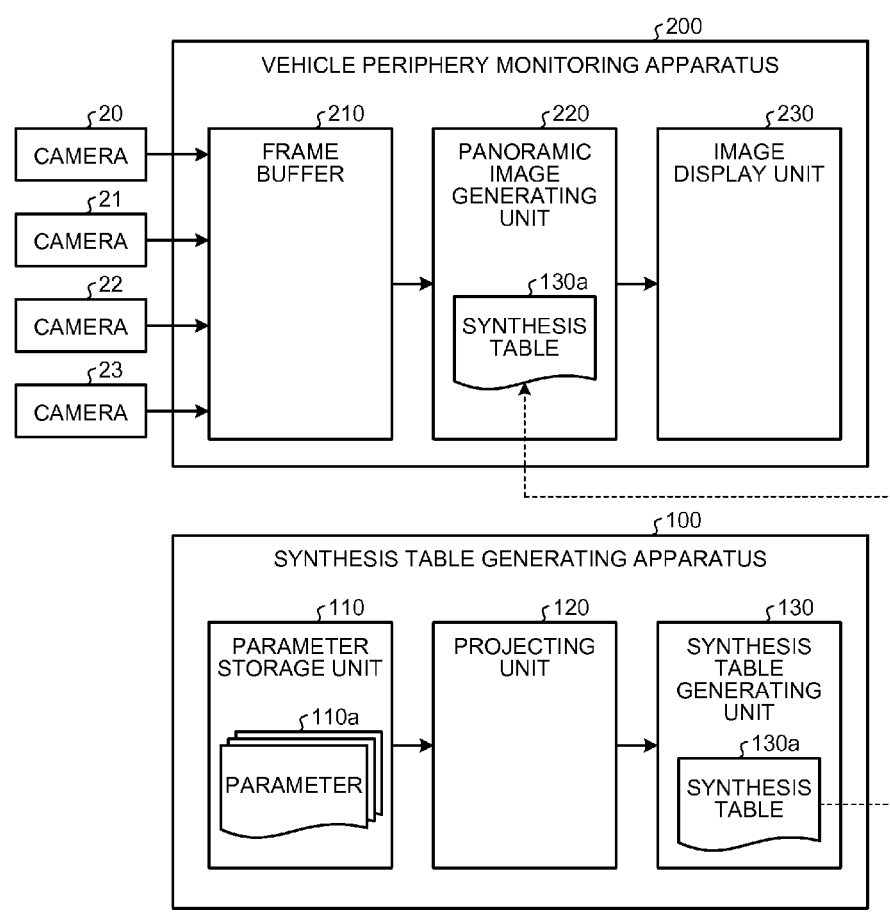
FIG. 14 is a block diagram illustrating the configurations of a vehicle periphery monitoring apparatus and a synthesis table generating apparatus according to Second Embodiment.
Figure 16:
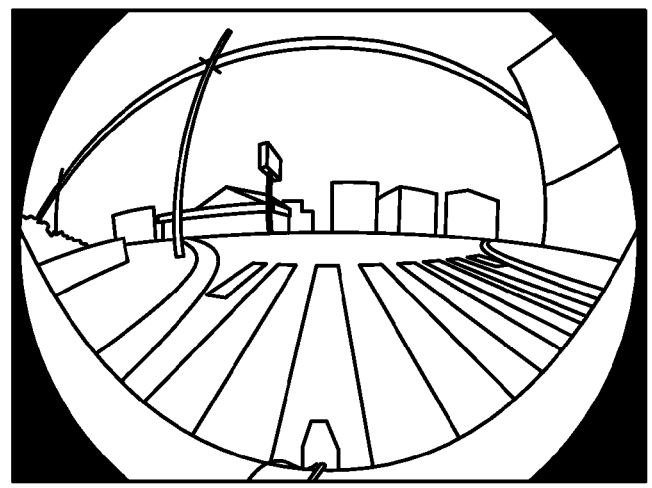
FIG. 16 is a diagram illustrating an example of a camera image according to Second Embodiment.
Figure 17:
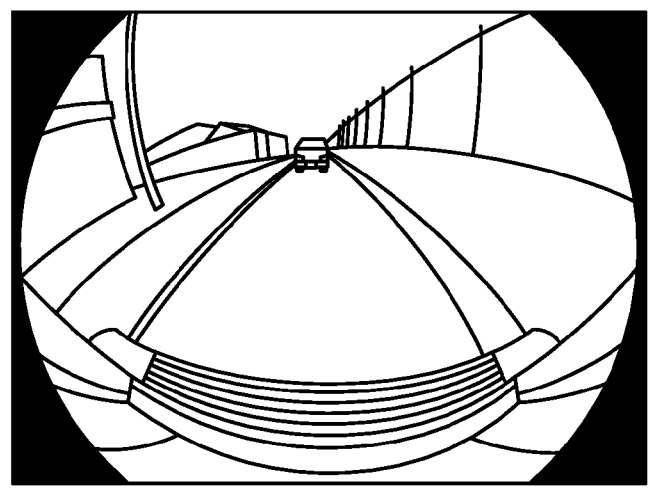
FIG. 17 is a diagram illustrating another example of a camera image according to Second Embodiment.
Figure 18:
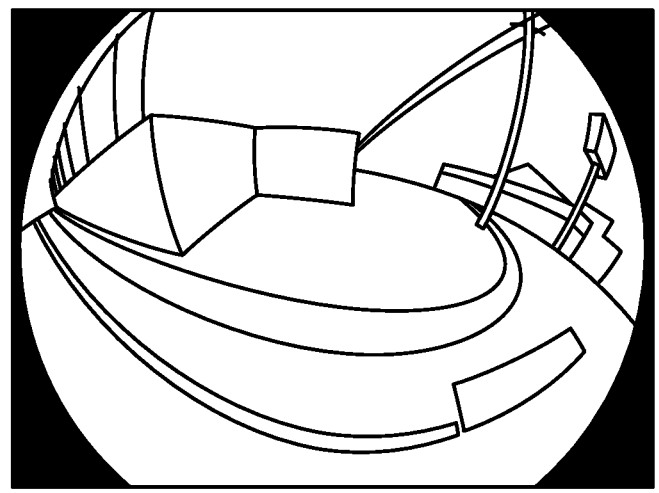
FIG. 18 is a diagram illustrating a further example of a camera image according to Second Embodiment.
Figure 19:
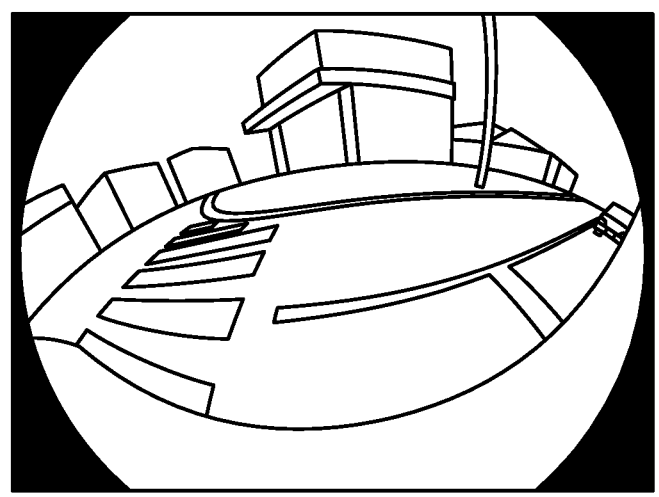
FIG. 19 is a diagram illustrating a yet further example of a camera image according to Second Embodiment.

Next, the configurations of a vehicle periphery monitoring apparatus 200 around the synthesis table generating apparatus 100 will be described. FIG. 14 is a block diagram illustrating the configuration of the vehicle periphery monitoring apparatus and the configuration of the synthesis table generating apparatus according to Second Embodiment. The synthesis table generating apparatus 100 according to Second Embodiment includes a parameter storage unit 110, a projecting unit 120, and a synthesis table generating unit 130 as illustrated in FIG. 14. Moreover, the vehicle periphery monitoring apparatus 200 according to Second Embodiment includes a frame buffer 210, a panoramic image generating unit 220, and an image display unit 230. Moreover, the synthesis table generating apparatus 100 and the vehicle periphery monitoring apparatus 200 are mounted to the vehicle 10. Moreover, the vehicle periphery monitoring apparatus 200 is connected to each of the synthesis table generating apparatus 100 and the cameras 20 to 23. Although Second Embodiment describes a case where the synthesis table generating apparatus 100 and the vehicle periphery monitoring apparatus 200 are mounted to the vehicle 10, the present embodiment is not limited to the case. For example, the synthesis table generating apparatus 100 may be installed outside the vehicle 10, and a synthesis table generated by the synthesis table generating apparatus 100 may be sent to the vehicle periphery monitoring apparatus 200.

The parameter storage unit 110 stores parameters 110a of the cameras 20 to 23. For example, the parameters 110a include positional parameters (xw, yw, zw) and angular parameters (θ, ψ, φ). Moreover, for example, the parameters 110a may be input by an individual who installs the cameras 20 to 23 in the vehicle 10. Moreover, for example, the parameters 110a are corrected by using the camera images 70 which are captured by the cameras 20 to 23 installed in the vehicle 10.

The projecting unit 120 projects position information of pixels included in the camera image captured by each of the plurality of cameras having a common subject area, as follows. That is, the projecting unit 120 projects the position information of the pixels that are present below a horizontal line in each camera image on the bottom surface of an infinite hemisphere, and the position information of the pixels that are present above the horizontal line in each camera image on the hemispherical surface of the infinite hemisphere. For example, the projecting unit 120 calculates each pixel position "P" of the camera image 70 corresponding to each pixel position "Q" of the panoramic image 80 generated from the plurality of camera images 70 by using the parameters of the cameras 20 to 23 and Expressions (1) to (36). Next, the projecting unit 120 extracts the pixel position "P" as a pixel position corresponding to the pixel position "Q" when the calculated pixel position "P" is the coordinates within the camera image.

For example, the projecting unit 120 calculates an incident light vectors "Vp(Q)" corresponding to the pixel position "Q=(qx, qy)" of the panoramic image 80 by using Expression (4) presented above. The angles "α" and "β" of Expression (4) are calculated by Expressions (5) and (6).

Next, the projecting unit 120 substitutes the calculated incident light vector "Vp(Q)" and the position "S=(0, 0, sz)" in Expression (20) presented above, and calculates a position "C=(Cx, Cy, Cz)" in the vehicle coordinate system. The constant "k" of Expression (20) is calculated by Expression (21) for "Vpz>0", and by Expression (22) for "Vpz≤0". Moreover, constants "a" to "c" of Expression (22) are calculated by Expressions (23) to (25). Moreover, for example, "1.5 m" is used as a height of driver's eye line "sz". Moreover, as the radius "R", "10 km" which is a sufficiently large value compared with the value of the distance between the cameras is used. The height of driver's eye line "sz" and the radius "R" are not be limited thereto, but may be arbitrarily set by the user of the synthesis table generating apparatus 100.

The reason why the radius "R" is not set to be infinite but set to "10 km" is that a panoramic image without a sense of unnaturalness can be generated with such settings. For example, when the radium "R" is set to "10 km", in a case where the distance between the cameras is "2 m", the influence of the parallax on the subject which exists in a distance of "114 m" from the projection center "S" is 1 degree or less. Similarly, the influence of the parallax on the subject which exists in a distance of "57 m" from the projection center "S" is 2 degrees or less. Similarly, the influence of the parallax on the subject which exists in a distance of "22 m" from the projection center "S" is 5 degrees or less.

Next, the projecting unit 120 substitutes the parameters of the cameras 20 to 23 and the calculated position "C=(Cx, Cy, Cz)" in Expression (26), and converts the position "C" in the vehicle coordinate system into a position "C*=(C*x, C*y, C*z)" in the camera coordinate system. "m11" to "m33" of Expression (26) are calculated by Expressions (27) to (35).

Next, the projecting unit 120 substitutes the converted position "C*=(C*x, C*y, C*z)" in Expression (36), and calculates the incident light vector "Vi". The projecting unit 120 substitutes the calculated incident light vector "Vi" in Expression (1), and calculates the pixel position "P=(px, py)".

Next, the projecting unit 120 determines whether the calculated pixel position "P" is included in the coordinates of the camera image 70. For example, when using a camera image 70 of "400×400 pixels", the projecting unit 120 determines whether the calculated pixel position "P=(px, py)" is included within a range of coordinates "(−200 to +200, −200 to +200)". The projecting unit 120 sets an effective flag of the pixel position "P" to "on" when it is determined that the calculated pixel position "P" is included in the coordinates of the camera image 70. Here, the effective flag is a flag that indicates whether the pixel position "P" corresponding to the pixel position "Q" of the panoramic image 80 is included in the coordinates of the camera images 70 captured by the cameras 20 to 23. Next, the projecting unit 120 extracts a pixel position "P", for which the effective flag is set to "on", as a pixel position corresponding to the pixel position "Q".

The synthesis table generating unit 130 generates a synthesis table 130a that indicates a correspondence relation between position information of each pixel included in the panoramic image 80 and position information of each pixel included in the camera images 70, based on the result of projection on the infinite hemisphere performed by the projecting unit 120. For example, the synthesis table generating unit 130 associates the pixel position "P", for which the effective flag is set to "on", with the pixel position "Q" of the panoramic image 80, and generates a synthesis table 130a. Next, the synthesis table generating unit 130 sends the generated synthesis table 130a to the panoramic image generating unit 220.

The synthesis table 130a generated by the synthesis table generating unit 130 stores a relation between the pixel positions "Q" of the panoramic image 80 and the pixel positions "P" of the camera image 70. FIG. 15 is a diagram illustrating an example of data stored in the synthesis table according to Second Embodiment. As illustrated in FIG. 15, the synthesis table 130a stores "effective flags" and combinations of "px" and "py" in association with combinations of "qx" and "qy" for every camera 20 to 23 to capture the camera images 70. Here, each combination of "qx" and "qy" represents the pixel position "Q" in the panoramic image. Moreover, each combination of "px" and "py" represents the pixel position "P" in the camera images captured by respective cameras. Moreover, the "effective flag" indicates that the association between the pixel position "Q" and the pixel position "P" is valid. For example, the synthesis table 130a stores the effective flag "1" and the combination of the px "78" and the py "456" for the camera 20 in association with the combination of the qx "156" and qy "63". In other words, the synthesis table 130a stores the relation that the pixel position "P=(78, 456)" of the camera image 70 captured by the camera 20 corresponds to the pixel position "Q=(156, 63)" of the panoramic image 80.

Moreover, the synthesis table 130a stores the effective flag "1" and the combination of the px "79" and the py "312" of the camera 21 in association with the combination of the qx "156" and the qy "63". In other words, the synthesis table 130a stores the relation that the pixel position "P=(79, 312)" of the camera image 70 captured by the camera 21 corresponds to the pixel position "Q=(156, 63)" of the panoramic image 80. Moreover, the synthesis table 130a stores the effective flag "0" and the combination of the px "null" and the py "null" of the camera 22 in association with the combination of the qx "156" and the qy "63". In other words, the synthesis table 130a stores the relation that the pixel position of the camera image 70 captured by the camera 22 does not correspond to the pixel position "Q=(156, 63)" of the panoramic image 80. Moreover, the synthesis table 130a stores the effective flag "0" and the combination of the px" null" and the py "null" of the camera 23 in association with the combination of the qx "156" and the qy "63". In other words, the synthesis table 130a stores the relation that the pixel position of the camera image 70 captured by the camera 23 does not correspond to the pixel position "Q=(156, 63)" of the panoramic image 80. The effective flag "1" indicates that the effective flag is set to "on" and that the pixel position "P" corresponding to the pixel position "Q" is included in the coordinates of the camera image 70. Moreover, "null" indicates that data for the position does not exist. In other words, the effective flag "0" and the combination of the px "null" and the py "null" indicate that the pixel position "P" corresponding to the pixel position "Q" is not included in the coordinates of the camera image 70. Moreover, similarly, even for other pixel positions of the panoramic image 80, the synthesis table 130a stores the "effective flags" and the combinations of the "px" and "py" for each of the cameras 20 to 23 in association with the combinations of the "qx" and "qy".

Let's return to the description of FIG. 14. The cameras 20 to 23 capture images of surroundings and generate data of the camera images 70. FIGS. 16 to 19 are diagrams illustrating examples of the camera images according to Second Embodiment. FIGS. 16 to 19 illustrate examples of the camera images captured by the cameras 20 to 23, respectively. Next, the cameras 20 to 23 transmit the generated data of the camera images to the frame buffer 210. As illustrated in FIGS. 4 and 5, although Second Embodiment describes a case where four cameras are installed in the vehicle 10, the present example is not limited thereto but may be applied to any cases as long as a plurality of cameras having a common subject area is installed in the vehicle 10. For example, a relatively large number of cameras may be installed at the rear side of the vehicle 10.

The frame buffer 210 stores the data of the camera images 70 received from the cameras 20 to 23. The frame buffer 210 stores the data of the camera images for each of the cameras 20 to 23.

The panoramic image generating unit 220 generates the panoramic image 80 from the plurality of camera images 70. For example, the panoramic image generating unit 220 acquires the data of the camera images 70 from the frame buffer 210. The panoramic image generating unit 220 extracts a pixel value of each pixel position "P", for which the effective flag is set to "on", from the data of the camera images 70, for each pixel position "Q" of the panoramic image 80, by referring to the synthesis table 130a received from the synthesis table generating unit 130. The pixel value is, for example, RGB (Red, Green, Blue) values. The panoramic image generating unit 220 blends the extracted pixel values of the pixel position "P" for each pixel position "Q" of an overlapping portion of each camera image 70. The blending may achieved by calculating an average value of the respective pixel values or by calculating a weighted average value based on weighted pixel positions.

Next, the panoramic image generating unit 220 generates the panoramic image 80 by recording the blended pixel value in the pixel position "Q". For example, when memories corresponding to an image of "1200×400 pixels" are included, the panoramic image generating unit 220 generates the panoramic image 80 by recording the blended pixel values in the memories of the pixel positions corresponding to the pixel positions Q. Next, the panoramic image generating unit 220 transmits the generated panoramic image 80 to the image display unit 230.

Figure 20:
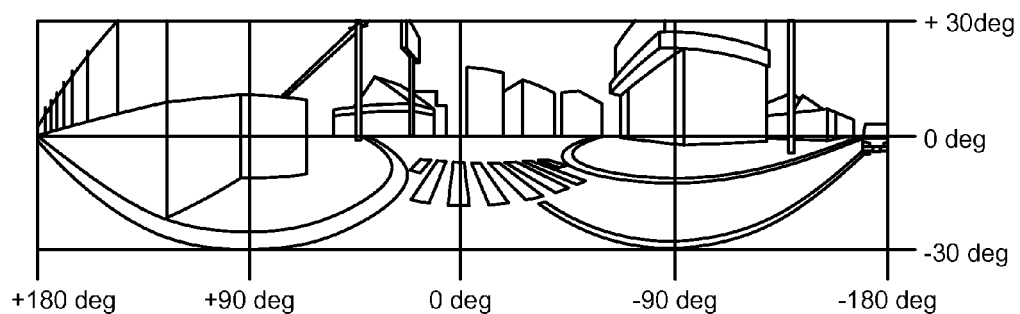
FIG. 20 is a diagram illustrating an example of a panoramic image displayed by the vehicle periphery monitoring apparatus according to Second Embodiment.

The image display unit 230 displays the panoramic image 80 received from the panoramic image generating unit 220. FIG. 20 is a diagram illustrating an example of the panoramic image displayed by the vehicle periphery monitoring apparatus according to Second Embodiment. For example, the image display unit 230 displays a panoramic image with a horizontal viewing angle "Aoh" of −180 to +180 degrees and a vertical viewing angle "Aov" of −30 to +30 degrees as illustrated in FIG. 20.

Processing Procedure According to Second Embodiment

Figure 21:
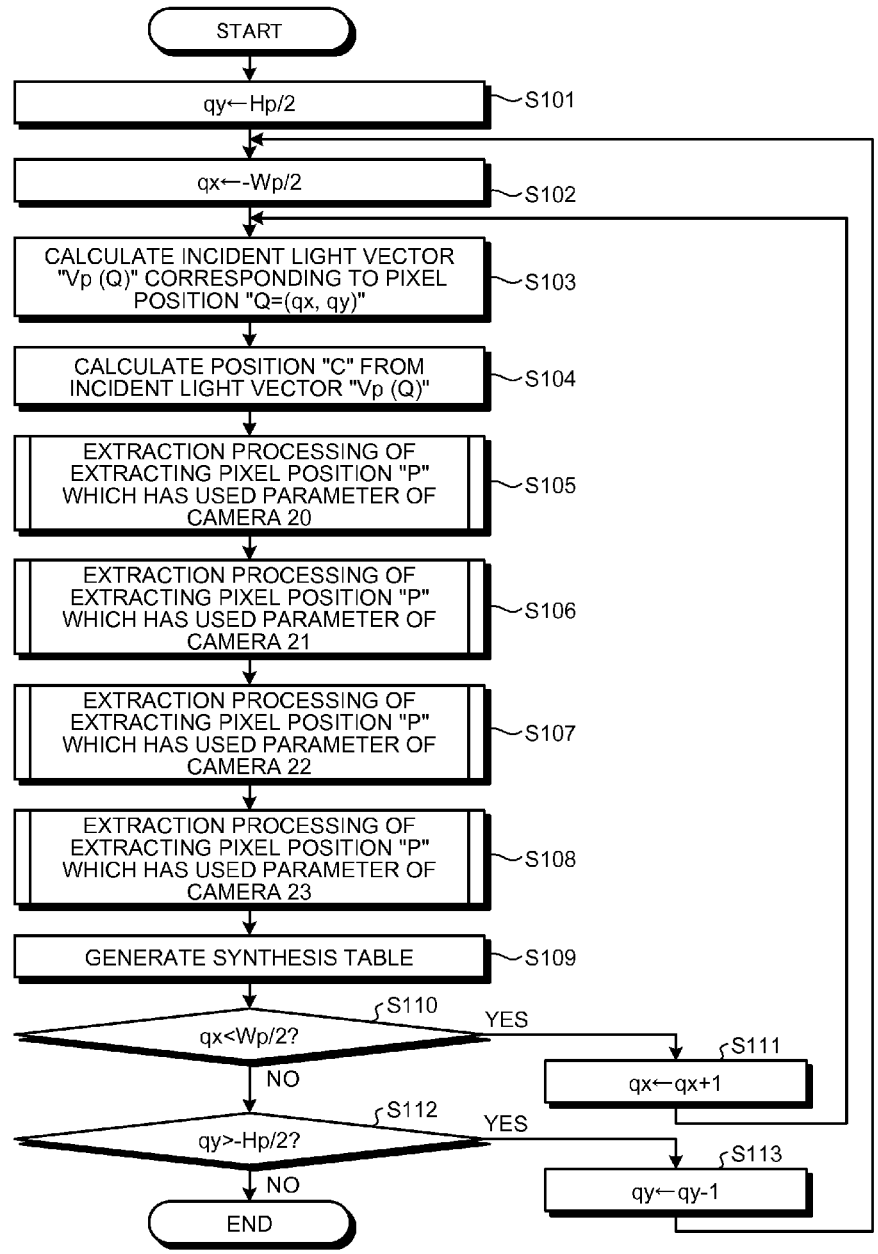
FIG. 21 is a flowchart illustrating processing procedure of the synthesis table generating apparatus according to Second Embodiment.

Processing procedure of the synthesis table generating apparatus 100 is described referring to FIG. 21. FIG. 21 is a flowchart that illustrates the processing procedure of the synthesis table generating apparatus according to Second Embodiment. The processing of the synthesis table generating apparatus 100 is performed before the processing of the vehicle periphery monitoring apparatus 200 is performed. For example, the processing of the synthesis table generating apparatus 100 is begun when the synthesis table generating apparatus 100 receives parameters of the cameras. Moreover, the processing of the synthesis table generating apparatus 100 is begun, for example, at a specified time point specified by the user of the synthesis table generating apparatus 100.

As illustrated in FIG. 21, the projecting unit 120 sets the coordinate "qy" to "Hp/2" (step S101). The coordinates "qy=Hp/2" represents the coordinates of an upper end of the panoramic image coordinate system illustrated in FIG. 8. The projecting unit 120 sets the coordinate "qx" to "−Wp/2" (step S102). The coordinates "qx=−Wp/2" represents the coordinates of a left end of the panoramic image coordinate system illustrated in FIG. 8.

The projecting unit 120 calculates an incident light vector "Vp(Q)" corresponding to a pixel position "Q=(qx, qy)" which is set, by using Expression (4) (step S103). Continuously, the projecting unit 120 calculates a position "C=(Cx, Cy, Cz)" from the calculated incident light vector "Vp(Q)" by using Expression (20) (step S104). Subsequently, the projecting unit 120 performs processing of extracting a pixel position "P=(px, py)" by using parameters of a camera n (n is 20, 21, 22 or 23) (step S105 to step S108).

Figure 22:
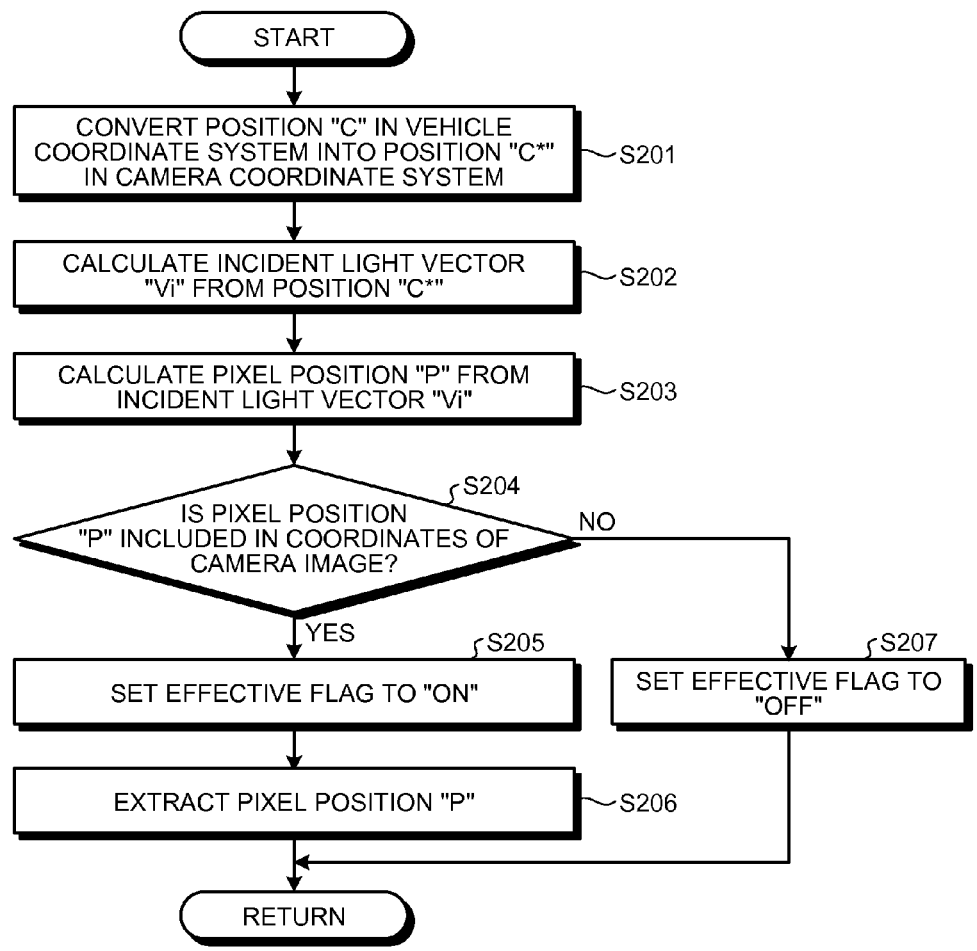
FIG. 22 is a flowchart illustrating processing procedure of the synthesis table generating apparatus according to Second Embodiment.

Here, the processing of extracting the pixel position "P=(px, py)" using the parameters of the camera n (n is 20, 21, 22 or 23) is described referring to FIG. 22. FIG. 22 is a flowchart that illustrates the processing procedure of the synthesis table generating apparatus according to Second Embodiment. As illustrated in FIG. 22, the projecting unit 120 converts a position "C" in the vehicle coordinate system into a position "C*=(C*x, C*y, C*z)" in the camera coordinate system by using the parameters of the camera n (n is 20, 21, 22 or 23) and Expression (26) (step S201).

Continuously, the projecting unit 120 calculates an incident light vector "Vi" from the position "C*=(C*x, C*y, C*z)" in the camera coordinate system converted by using Expression (36) (step S202). Subsequently, the projecting unit 120 calculates a pixel position "P=(px, py)" from the calculated incident light vector "Vi" by using Expression (1) (step S203).

Continuously, the projecting unit 120 determines whether the pixel position "P=(px, py)" is included in the coordinates of the camera image 70 (step S204). When it is determined that the pixel position "P" is included in the coordinates of the camera image 70 (Yes in step S204), the projecting unit 120 sets the effective flag of the pixel position "P" to "on" (step S205). Subsequently, the projecting unit 120 extracts a pixel position "P", for which the effective flag is set to "on", as a pixel position corresponding to the pixel position "Q" (step S206). On the other hand, when it is determined that the pixel position "P" is not included in the coordinates of the camera image 70 (No in step S204), the projecting unit 120 sets the effective flag of the pixel position "P" to "off" (step S207).

Let's return to the description of FIG. 21. The synthesis table generating unit 130 generates a synthesis table 130a (step S109). For example, the synthesis table generating unit 130 records the effective flag and the pixel position "P" in the synthesis table 130a, in association with the pixel position "Q" of the panoramic image 80.

Continuously, the synthesis table generating unit 130 determines whether the coordinate "qx" has a value smaller than "Wp/2" (step S110). When the coordinate "qx" is determined to have a value smaller than "Wp/2" (Yes in step S110), the synthesis table generating unit 130 sets the coordinate "qx" to "qx+1" and returns to the processing of step S103 (step S111). In other words, the synthesis table generating unit 130 sets a coordinate of a pixel on one pixel right side of the coordinate "qx" in the panoramic image coordinate system as a processing target, and executes the processing of step S103 and the subsequent steps.

On the other hand, when the coordinate "qx" is determined not to have a value smaller than "Wp/2" (No in step S110), the synthesis table generating unit 130 determines whether the coordinate "qy" has a value larger than "−Hp/2" (step S112). When the coordinate "qy" is determined to have a value larger than "−Hp/2" (Yes in step S112), the synthesis table generating unit 130 sets the coordinate "qy" to "qy−1" and returns to the processing of step S102 (step S113). In other words, the synthesis table generating unit 130 sets a coordinate which is one pixel below the coordinate "qy" in the panoramic image coordinate system as the following processing target, and executes the processing of step S102 and the subsequent steps.

On the other hand, when the coordinate "qy" is determined not to have a value larger than "−Hp/2" (No in step S111), the synthesis table generating unit 130 ends the processing. The processing of from step S102 to step S113 is repeated until the processing is performed for all of the pixel positions "Q" of the panoramic image 80.

The above-described processing procedure may not be limited to the above-described order, but be suitably changed within the range where the processing contents are not contradictable. For example, the processing of step S105 to step S108 which is the extraction processing of extracting the pixel position "P" which has used the parameters of the camera n (n is 20, 21, 22 or 23) may be executed in arbitrary order. Moreover, the processing of steps S105 to S108 may be executed in parallel, for example.

Moreover, the processing procedure has been described such that the processing is performed sequentially from the coordinates of the upper left point of the panoramic image coordinate system, but the present example is not limited thereto. For example, the processing procedure may be executed from arbitrary coordinates of the panoramic image coordinate system. Moreover, for example, the panoramic image coordinate system may be divided into four areas, and the processing procedure may be simultaneously executed for the four areas.

Figure 23:
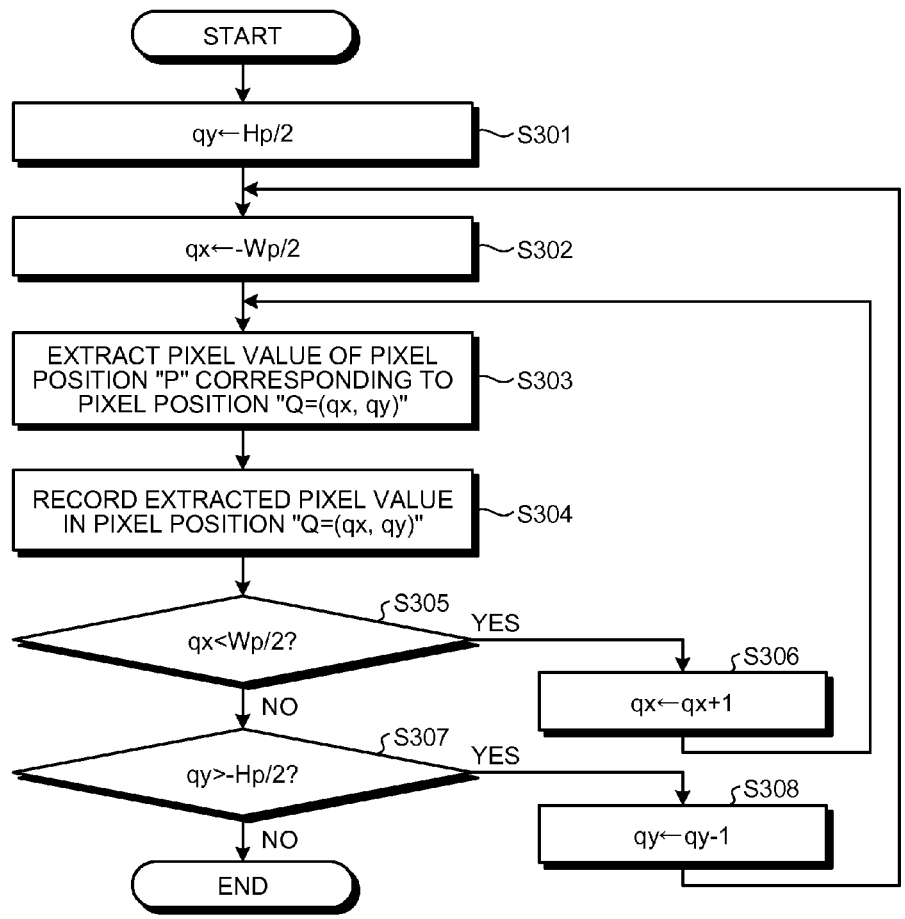
FIG. 23 is a flowchart illustrating processing procedure of the vehicle periphery monitoring apparatus according to Second Embodiment.

Next, processing procedure of the vehicle periphery monitoring apparatus 200 is described referring to FIG. 23. FIG. 23 is a flowchart that illustrates the processing procedure of the vehicle periphery monitoring apparatus according to Second Embodiment. The processing of the vehicle periphery monitoring apparatus 200 may be begun at arbitrary timing when there is a synthesis table 130a. For example, the processing of the vehicle periphery monitoring apparatus 200 is begun along with the start of the vehicle 10 and the camera. Moreover, the processing may be begun at a time point specified by the user of the vehicle periphery monitoring apparatus 200.

As illustrated in FIG. 23, the panoramic image generating unit 220 sets the coordinate "qy" to "Hp/2" (step S301). The panoramic image generating unit 220 sets the coordinate "qx" to "−Wp/2" (step S302).

The panoramic image generating unit 220 extracts a pixel value of the pixel position "P" corresponding to the set pixel position "Q=(qx, qx)" from the data of the camera image 70 (step S303). For example, the panoramic image generating unit 220 extracts the pixel value of the pixel position "P", for which the effective flag is set to "on", from the data of the camera image 70, by referring to the synthesis table 130a. The panoramic image generating unit 220 continuously records the extracted pixel value in the pixel position "Q" (step S304). At this time, as for the pixel positions "Q" corresponding to an overlapping portion of each camera image 70, the panoramic image generating unit 220 blends the extracted pixel values of the pixel position "P" and records the blended pixel value in the pixel position "Q".

Continuously, the panoramic image generating unit 220 determines whether the coordinate "qx" has a value smaller than "Wp/2" (step S305). When the coordinate "qx" is determined to have a value smaller than "Wp/2" (Yes in step S305), the panoramic image generating unit 220 sets the coordinate "qx" to "qx+1" (step S306) and returns to step S303. In other words, the panoramic image generating unit 220 sets a coordinate on one pixel right side of the coordinate "qx" in the panoramic image coordinate system as a processing target, and executes the processing of step S103 and the subsequent steps.

On the other hand, when the coordinate "qx" is determined not to have a value smaller than "Wp/2" (No in step S305), the panoramic image generating unit 220 determines whether the coordinate "qy" has a value larger than "−Hp/2" (step S307). When the coordinate "qy" is determined to have a value larger than "−Hp/2" (Yes in step S307), the panoramic image generating unit 220 sets the coordinate "qy" to "qy−1" (step S308) and returns to step S302. In other words, the panoramic image generating unit 220 sets a coordinate one pixel below the coordinate "qy" in the panoramic image coordinate system as a processing target and executes the processing of step S102 and the subsequent steps.

On the other hand, when the coordinate "qy" is determined not to have a value larger than "−Hp/2" (No in step S307), the panoramic image generating unit 220 ends the processing. The processing of steps S302 to S308 is repeated until processing is completed for all the pixel positions "Q" of the panoramic image 80. The panoramic image generating unit 220 generates one panoramic image 80 by the above-mentioned processing, and transmits the generated panoramic image 80 to the image display unit 230. Next, whenever panoramic image 80 is received from the panoramic image generating unit 220, the image display unit 230 updates and displays the panoramic image 80.

Advantages of Second Embodiment

The synthesis table generating apparatus 100 generates the synthesis table 130a that indicates a relation between the pixel positions "Q" of the panoramic image 80 and the pixel positions "P" of the camera images 70 by using the parameters of the cameras 20 to 23 as described above. The vehicle periphery monitoring apparatus 200 generates the panoramic image by extracting the pixel values of the pixel positions "P" corresponding to the pixel positions "Q" of the panoramic image, referring to the synthesis table 130a generated by the synthesis table generating apparatus 100. With this processing, according to Second Embodiment, the panoramic image, which gives a sense of less unnaturalness to the user, can be generated.

Moreover, the synthesis table generating apparatus 100 calculates the position "C=(Cx, Cy, Cz)" for "Vpz>0" as a point on the hemispherical surface of the three-dimensional screen 40, and associates the pixel position "Q" and the pixel position "P" with each other. In other words, the synthesis table generating apparatus 100 projects the pixel position that is above a horizontal line that passes the center "S" on the hemispherical surface of the three-dimensional screen 40. Since subjects in the distance are often included in images that are above the horizontal line, according to Second Embodiment, the panoramic image, which stochastically reduces the influence of the parallax on the images that are above the horizontal line in the camera images, can be generated.

Moreover, the synthesis table generating apparatus 100 calculates the position "C=(Cx, Cy, Cz)" for "Vpz≤0" as a point on the bottom surface of the three-dimensional screen 40, and associates the pixel position "Q" and the pixel position "P" with each other. In other words, the synthesis table generating apparatus 100 projects the pixel position that is below the horizontal line that passes the center "S" on the bottom surface of the three-dimensional screen 40. Since objects that exist on the road are often included in the images that are below the horizontal line, according to Second Embodiment, the panoramic image, which stochastically reduces the influence of the parallax on the images that are below the horizontal line in the camera images, can be generated.

Moreover, the synthesis table generating apparatus 100 generates the synthesis table 130a that indicates a relation between the pixel positions "Q" of the panoramic image 80 and the pixel positions "P" of the camera image 70 before the generation of the panoramic image. Next, the vehicle periphery monitoring apparatus 200 generates the panoramic image by using the synthesis table 130a generated by the synthesis table generating apparatus 100. Therefore, according to Second Embodiment, the panoramic image can be generated in a small number of processing steps.

Moreover, the vehicle periphery monitoring apparatus 200 generates the panoramic image in a smaller number of processing steps by using the synthesis table 130a generated by the synthesis table generating apparatus 100. Therefore, according to Second Embodiment, the panoramic image can be generated from moving images captured by the cameras 20 to 23.

The cameras 20 to 23 correspond to CMOS (Complementary Metal Oxide Semiconductor) image sensor cameras, CCD (Charge Coupled Device) image sensor cameras, or the like. The data of the camera images generated by the cameras 20 to 23 may be still images or moving images.

Moreover, the parameter storage unit 110 and/or the frame buffer 210 may correspond to an optical disk, a hard disk, or a semiconductor memory device such as RAM (Random Access Memory), ROM (Read Only Memory), flash memory, etc.

Moreover, the projecting unit 120, the synthesis table generating unit 130, and the panoramic image generating unit 220 are realized in the form of an integrated circuit or an electronic circuit. For example, an ASIC (Application Specific Integrated Circuit), an FPGA (Field Programmable Gate Array), etc. can be applied as the integrated circuit. Moreover, a CPU (Central Processing Unit), an MPU (Micro Processing Unit), etc. can be applied as the electronic circuit. For example, the image display unit 230 corresponds to, for example, a monitor, a liquid crystal display, etc.

[c] Third Embodiment

An example of a vehicle periphery monitoring apparatus according to Third Embodiment is described hereinbelow. Third Embodiment is described in connection with a case where a vehicle periphery monitoring apparatus generates a panoramic image without using a synthesis table. The vehicle periphery monitoring apparatus is an example of the image generating apparatus of First Embodiment. Since expressions used by the vehicle periphery monitoring apparatus according to Third Embodiment are the same as those of Second Embodiment, the description is not repeated.

Configuration of Third Embodiment

Figure 24:
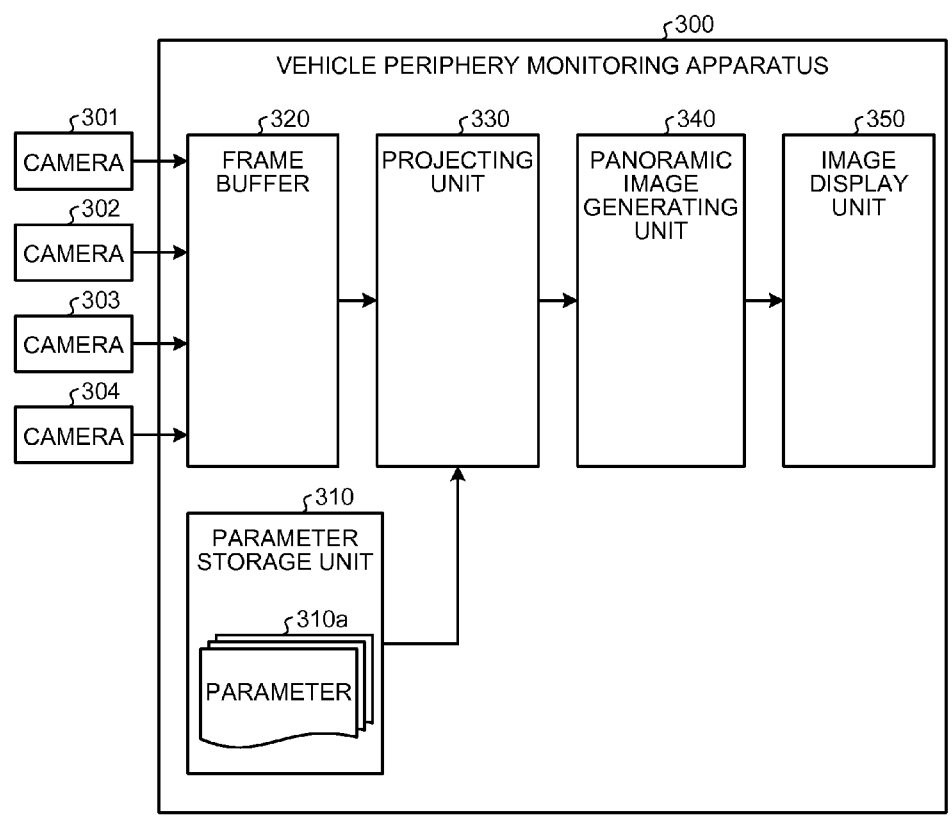
FIG. 24 is a block diagram illustrating the configuration of a vehicle periphery monitoring apparatus according to Third Embodiment.

The configuration of a vehicle periphery monitoring apparatus according to Third Embodiment is described. FIG. 24 is a block diagram illustrating the configuration of the vehicle periphery monitoring apparatus according to Third Embodiment. As illustrated in FIG. 24, a vehicle periphery monitoring apparatus 300 according to Third Embodiment includes a parameter storage unit 310, a frame buffer 320, a projecting unit 330, a panoramic image generating unit 340, and an image display unit 350. Moreover, the vehicle periphery monitoring apparatus 300 is mounted to a vehicle 10. Moreover, the vehicle periphery monitoring apparatus 300 is connected with cameras 301 to 304. Since the cameras 301 to 304, the parameter storage unit 310, the frame buffer 320, and the image display unit 350 illustrated in FIG. 24 correspond to the cameras 20 to 23, the parameter storage unit 110, the frame buffer 210, and the image display unit 230 illustrated in FIG. 14, and perform the same processing as the corresponding ones, the description thereof is not repeated.

The projecting unit 330 projects, within each camera image received by the frame buffer 320, images that are below the horizontal line in each camera image on the bottom surface of an infinite hemisphere, and images that are above the horizontal line in each camera image on the hemispherical surface of the infinite hemisphere. For example, the projecting unit 330 calculates a pixel positions "P" of a plurality of camera images 70 corresponding to pixel positions "Q" of a panoramic image 80 generated from the plurality of camera images 70 by using the parameters of the cameras 301 to 304 and Expressions (1) to (36) presented above. Next, when the calculated pixel positions "P" are coordinates within the camera images, the projecting unit 330 extracts pixel values of the pixel positions "P" as pixel values corresponding to pixel positions "Q".

For example, the projecting unit 330 calculates incident light vectors "Vp(Q)" corresponding to the pixel positions "Q=(qx, qy)" of the panoramic image 80 by using above-mentioned Expression (4). Angles "α" and "β" of Expression (4) are calculated by using Expression (5) and Expression (6).

The projecting unit 330 continuously substitutes the calculated incident light vectors "Vp(Q)" and positions "S=(0, 0, sz)" in Expression (20) described above, and calculates positions "C=(Cx, Cy, Cz)" in a vehicle coordinate system. A constant "k" of Expression (20) is calculated by using Expression (21) for "Vpz>0", and calculated by using Expression (22) for "Vpz≤0". Moreover, constants "a" to "c" of Expression (22) are calculated by using Expressions (23) to (25). Moreover, as for "sz", for example, "1.5 m" is used as a height of a driver's eye line. Moreover, as for a radius "R", for example, "10 km" is used as a sufficiently high value compared with the distance between the cameras. The "sz" and "R" may not be limited to these values, but arbitrary values may be set by the user of a synthesis table generating apparatus 100.

Continuously, the projecting unit 330 substitutes the calculated positions "C=(Cx, Cy, Cz)" and the parameters of the cameras 301 to 304 in Expression (26) described above, and converts the positions "C" in the vehicle coordinate system into positions "C*=(C*x, C*y, C*z)" in a camera coordinate system. "m11" to "m33" of Expression (26) are calculated by using Expressions (27) to (35).

Continuously, the projecting unit 330 substitutes the converted positions "C*=(C*x, C*y, C*z)" in Expression (36), and calculates incident light vectors "Vi". The projecting unit 120 substitutes the calculated incident light vectors "Vi" in Expression (1), and calculates pixel positions "P=(px, py)".

Continuously, the projecting unit 330 determines whether the calculated pixel positions "P" are within the coordinates of the camera images 70. The projecting unit 330 extracts pixel values of the pixel positions "P" when the calculated pixel positions "P" are determined to be included in the coordinates of the camera image 70.

The panoramic image generating unit 340 generates the panoramic image 80 based the images projected on the infinite hemisphere by the projecting unit 330. For example, the panoramic image generating unit 340 records the pixel values of the pixel positions "P" extracted by the projecting unit 330 in corresponding pixel positions "Q". Here, for the pixel positions "Q" in overlapping portions of each of the camera images 70, the panoramic image generating unit 340 blends the extracted pixel values of each pixel position "P". The panoramic image generating unit 340 generates the panoramic image 80 by recording the extracted pixel values in the corresponding pixel positions "Q" For example, when memories corresponding to an image of "1200×400 pixels" are provided, the panoramic image generating unit 220 generates the panoramic image 80 by recording the blended pixel value in the memory of the corresponding pixel position "Q". Next, the panoramic image generating unit 340 sends the generated panoramic image 80 to the image display unit 350.

Processing Procedure According to Third Embodiment

Figure 25:
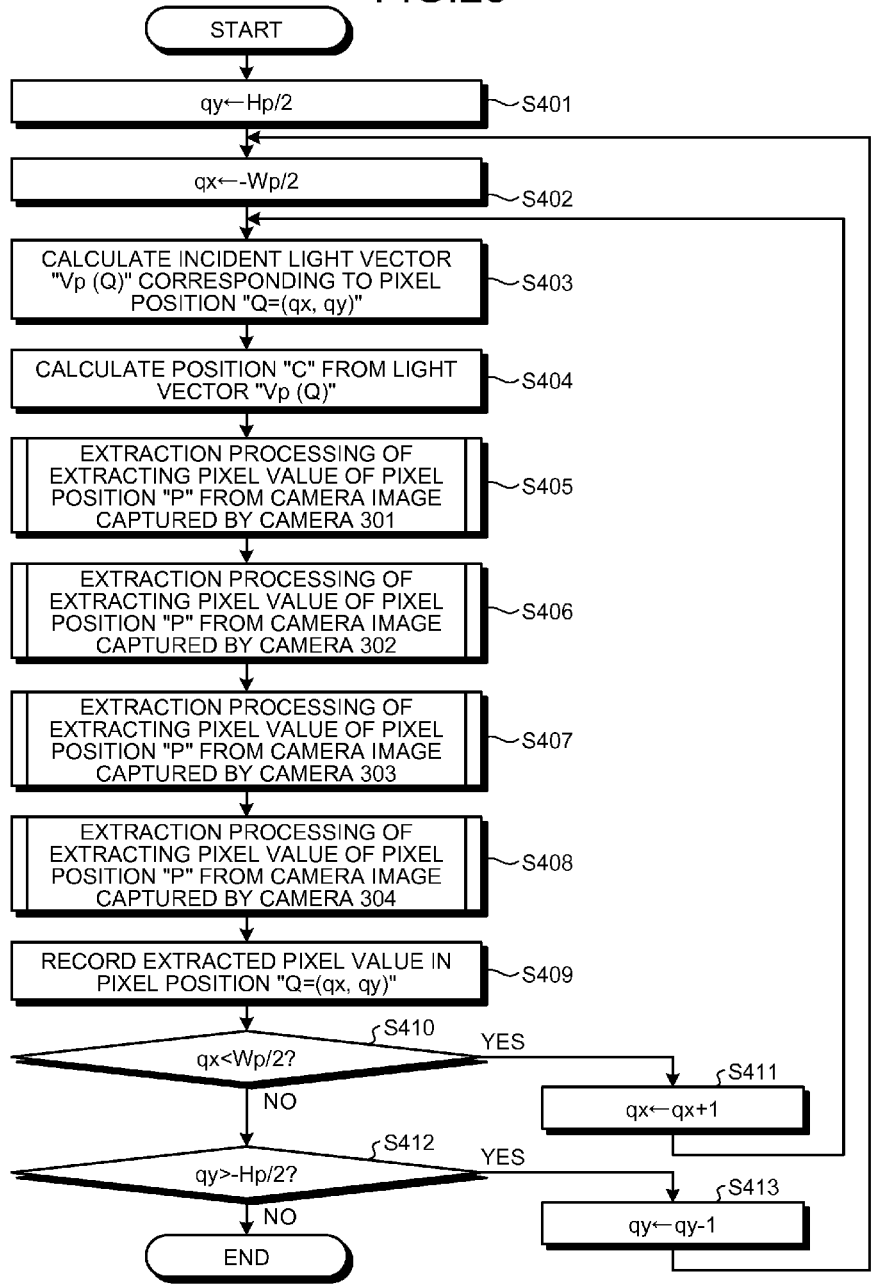
FIG. 25 is a flowchart illustrating processing procedure of the vehicle periphery monitoring apparatus according to Third Embodiment.

Processing procedure of the vehicle periphery monitoring apparatus 300 is described referring to FIG. 25. FIG. 25 is a flowchart that illustrates the processing procedure of the vehicle periphery monitoring apparatus according to Third Embodiment. The processing of the vehicle periphery monitoring apparatus 300 may be begun at arbitrary timing. For example, the processing of the vehicle periphery monitoring apparatus 200 is begun along with the start of the vehicle 10 and the cameras. Moreover, for example, it may be begun at the time point specified by the user of the vehicle periphery monitoring apparatus 200.

The projecting unit 330 sets a coordinate "qy" to "Hp/2" as illustrated in FIG. 25 (step S401). The projecting unit 330 sets a coordinate "qx" to "−Wp/2" (step S402).

The projecting unit 330 calculates an incident light vector "Vp(Q)" corresponding to the set pixel position "Q=(qx, qy)" by using Expression (4) (step S403). Continuously, the projecting unit 330 calculates the position "C=(Cx, Cy, Cz)" from the calculated incident light vector "Vp(Q)" by using Expression (20) (step S404). Next, the projecting unit 330 performs extraction processing of extracting a pixel value of the pixel position "P=(px, py)" from each camera image captured by a camera n (n is 301, 302, 303 or 304) (step S405 to step S408).

Figure 26:
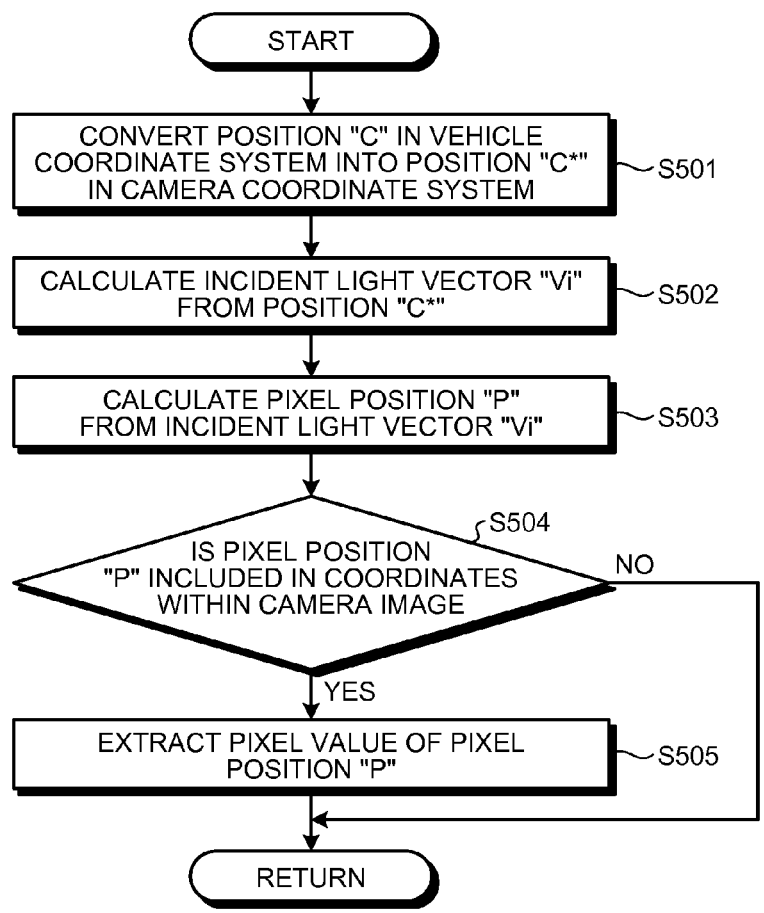
FIG. 26 is a flowchart illustrating processing procedure of the vehicle periphery monitoring apparatus according to Third Embodiment.

Hereinbelow, the processing of extracting the pixel value of the pixel position "P=(px, py)" from each camera image captured by the camera n (n is 301, 302, 303 or 304) is described referring to FIG. 26. FIG. 26 is a flowchart that illustrates processing procedure of the vehicle periphery monitoring apparatus according to Third Embodiment. The projecting unit 330 converts the position "C" in the vehicle coordinate system into a position "C*=(C*x, C*y, C*z)" in a camera coordinate system by using Expression (26) and the parameters of the camera n (n is 301, 302, 303 or 304) (step S501).

Continuously, the projecting unit 330 calculates an incident light vector "Vi" from the converted position "C*=(C*x, C*y, C*z)" in the camera coordinate system by using Expression (36) (step S502). Next, the projecting unit 330 calculates a pixel position "P=(px, py)" from the calculated incident light vector "Vi" by using Expression (1) (step S503).

Continuously, the projecting unit 330 determines whether the pixel position "P=(px, py)" is included in coordinates of the camera image 70 (step S504). When the pixel position "P" is determined to be included in the coordinates of the camera image 70 (Yes in step S504), the projecting unit 330 extracts a pixel value of the pixel position "P" as a pixel value corresponding to the pixel position "Q" (step S505). On the other hand, when the pixel position "P" is determined not to be included in the coordinates of the camera image 70 (No in step S504), the projecting unit 330 ends the processing.

Let's return to the description of FIG. 25. The panoramic image generating unit 340 records the extracted pixel value in the pixel position "Q" (step S409). At this time, for pixel positions "Q" in the overlapping portion of each of the camera images 70, the panoramic image generating unit 340 blends the extracted pixel values of the pixel position and records the blended pixel value in the pixel position "Q".

The panoramic image generating unit 340 continuously determines whether the coordinate "qx" has a value smaller than "Wp/2" (step S410). When the coordinate "qx" is determined to have a value smaller than "Wp/2" (Yes in step S410), the panoramic image generating unit 340 sets the coordinate "qx" to "qx+1" (step S411), and returns to step S403. In other words, the panoramic image generating unit 340 sets a coordinate on one pixel right side of the coordinate "qx" in the panoramic image coordinate system as a processing target, and executes the processing of step S403 and the subsequent steps.

On the other hand, when the coordinate "qx" is determined not to have a value smaller than "Wp/2" (No in step S410), the panoramic image generating unit 340 determines whether the coordinate "qy" has a value larger than "−Hp/2" (step S412). When the coordinate "qy" is determined to have a value larger than "−Hp/2" (Yes in step S412), the panoramic image generating unit 340 sets the coordinate "qy" to "qy−1" (step S413), and returns to the processing of step S402. In other words, the panoramic image generating unit 340 sets a coordinate which is one pixel below the coordinate "qy" in the panoramic image coordinate system as a processing target, and executes the processing of step S402.

On the other hand, when the coordinate "qy" is determined not to have a value larger than "−Hp/2" (No in step S412), the panoramic image generating unit 340 ends the processing. The processing of steps S402 to S413 described above is repeated until the processing is performed for all of the pixel positions "Q" of the panoramic image 80. The panoramic image generating unit 340 generates one sheet of the panoramic image 80 by the above-described processing, and sends the generated panoramic image 80 to the image display unit 350. Next, the image display unit updates and displays the panoramic image whenever receiving the panoramic image 80 from the panoramic image generating unit 340.

The processing procedure described above may not be limited to the order described above, and be changed arbitrarily within the range where the processing contents are not contradictable. For example, the processing of steps S405 to step S408 which is the processing of extracting the pixel value of the pixel position "P" from each camera image captured by the camera n (n is 20, 21, 22 or 23) may be executed in arbitrary order. Moreover, for example, the processing of steps S405 to step S408 may be executed in parallel.

Moreover, the processing procedure described above is a case where the processing is sequentially executed from the upper left of the panoramic image coordinate system, but the present example is not limited thereto. For example, the processing procedure may be executed from arbitrary coordinates of the panoramic image coordinate system. Moreover, for example, the panoramic image coordinate system may be divided into four areas and the processing for the four areas are simultaneously performed.

Advantages of Third Embodiment

The vehicle periphery monitoring apparatus 300 extracts the pixel value of the pixel position "P" corresponding to the pixel position "Q" of the panoramic image 80 by using the parameters of the cameras 301 to 304 as described above. Next, the vehicle periphery monitoring apparatus 300 generates the panoramic image from the extracted pixel values of the pixel positions "P". Through this processing, according to Third Embodiment, the panoramic image that gives a sense of less unnaturalness to the user can be generated without generating a synthesis table.

[d] Fourth Embodiment

Although some examples of the present invention has been described so far, the present invention may be implemented in the form of other examples besides the examples described above. Accordingly, other examples are described below.

Application of Image Generating Apparatus

In the example described above, the description is made in connection with a case where the image generating apparatus is mounted to a vehicle. However, the examples of the present invention are not limited thereto. For example, the image generating apparatus may be mounted to a ship, a monitoring device, a robot, etc. As a result, the image generating apparatus disclosed in the present application causes a panoramic image which gives a sense of less unnaturalness to be generated in an apparatus to which the image generating apparatus is mounted.

Processing in Projecting Unit

The above examples are described in connection with a case where the image generating apparatus sets the center "S" of the projection to a position which is directly above the origin "O" of the vehicle coordinate system, that is, a case where the center "S=(0, 0, sz)". However, the present example is not limited thereto. For example, the image generating apparatus may set the center "S" to arbitrary coordinates "S=0(Sx, Sy, Sz)". At this time, the constant "k" of Expression (20) is represented by Expression (19) for "Vpz>0" and is represented by Expression (18) for "Vpz≤0". The constants "a" to "c" of Expression (18) is represented by Expressions (13) to (15). As a result, the image generating apparatus disclosed by the present application can generate a less unnatural panoramic image, the center "S" of which is aligned with the user's eye line.

Moreover, the examples have been described above in connection with a case the synthesis table generating apparatus 100 projects pixel positions above a horizontal line which passes the center "S" on the hemispherical surface of the three-dimensional screen 40, and projects the pixel positions below the horizontal line that passes the center "S" on the bottom surface of the three-dimensional screen 40 (See FIG. 12). However, the present example is not limited thereto. For example, the synthesis table generating apparatus 100 may project the pixel positions on the hemispherical surface of the three-dimensional screen 40 for "Vpz≤N", and may project the pixel positions on the bottom surface of the three-dimensional screen 40 for "Vpz>N" (where N is an arbitrary number, see Expressions (20) to (22)). That is, the user of the synthesis table generating apparatus 100 can set the horizontal line to an arbitrary position by setting "N" to an arbitrary number. As a result, the image generating apparatus disclosed by the present application can generate a panoramic image using the horizontal line set by the user.

Moreover, the above examples have been described in connection with a case where the synthesis table generating apparatus 100 associates the pixel positions "P" for all of the pixel positions "Q" of the panoramic image, but the present example is not limited thereto. For example, the synthesis table generating apparatus 100 may generate a synthesis table 130a defined as a group of correspondence relations between the pixel positions "Q" and the pixel positions "P" and may generate undefined pixel positions "Q" by linear interpolation when generating a panoramic image. As a result, the synthesis table generating apparatus 100 can generate the synthesis table 130a with a reduced amount of data.

Processing in Panoramic Image Generating Unit

The panoramic image generating unit 220 may generate a panoramic image such that a camera image captured by a predetermined camera is located at the center of the panoramic image depending on the status of a vehicle 10 to which a plurality of cameras is mounted.

Figure 27:
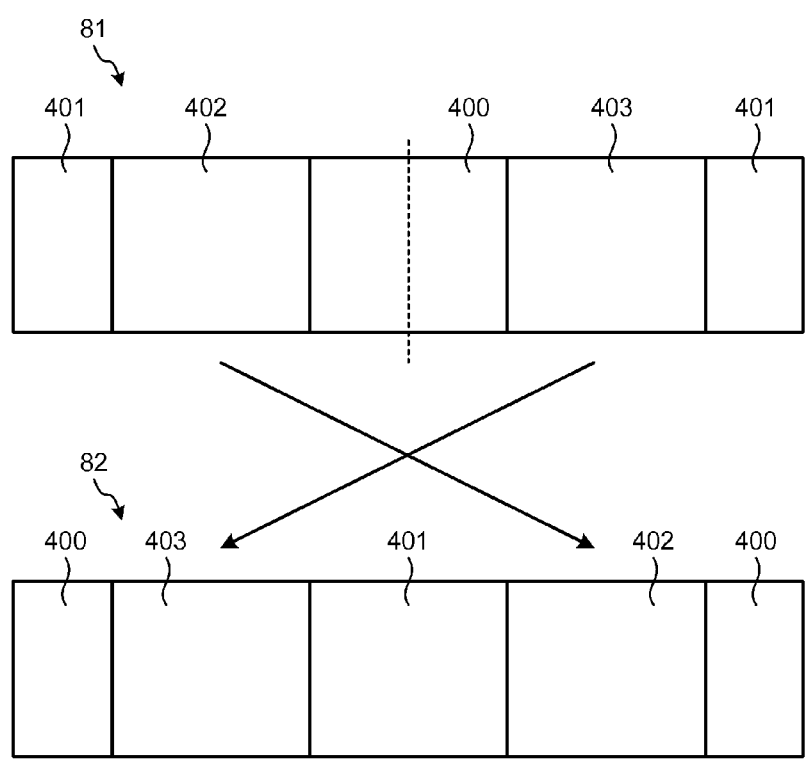
FIG. 27 is a diagram to describe an example of panoramic image generation processing according to Second Embodiment.

An example of processing of generating a panoramic image depending on the status of a vehicle example is described referring to FIG. 27. FIG. 27 is a diagram to describe an example of the processing of generating a panoramic image according to Second Embodiment. For example, the panoramic image generating unit 220 includes a generation memory and a display memory. The panoramic image generating unit 220 generates a panoramic image for generation 81 by recording the pixel value in the generation memory as illustrated in FIG. 27. An area 400 within the panoramic image for generation 81 is an area in which the pixel values of a camera image captured by a front camera 20 are recorded. Moreover, an area 401 is an area in which the pixel values of a camera image captured by a rear camera 21 are recorded. Moreover, an area 402 is an area in which the pixel values of a camera captured by a left camera 22 are recorded. Moreover, an area 403 is an area in which the pixel values of a camera image captured by a right camera 23 are recorded. In other words, the panoramic image generating unit 220 generates the panoramic image for generation 81 such that the camera image 70 captured by the front camera 20 is located at the center of the panoramic image for generation 81.

Continuously, the panoramic image generating unit 220 generates a panoramic image for display 82 by receiving information that indicates the status of the vehicle 10 and re-recording the pixel values of the panoramic image for generation 81 in the display memory. For example, when the panoramic image generating unit 220 receives information that an operation lever of the vehicle 10 is shifted from a drive range to a reverse range, from the vehicle 10, the panoramic image generating unit 220 determines the effect of replacing a central position of the panoramic image with the area 401. The panoramic image generating unit 220 divides the panoramic image for generation 81 at a position of a dotted line illustrated in FIG. 27, that is, at a position of a horizontal field angle 180 degrees with respect to the center of the area 401. Next, the panoramic image generating unit 220 generates the panoramic image for display 82 by uniting the divided panoramic images such that the area 401 is located at the center. The panoramic image for display 82 which is generated in this way is displayed on the image display unit 230. In other words, when the operation level is shifted from the drive range to the reverse range, a panoramic image in which the camera image captured by the rear camera 21 is located at the center is displayed on the image display unit 230. As a result, the panoramic image generating unit 220 can generate a panoramic image with less unnaturalness according to the status of the vehicle.

The example illustrated in FIG. 27 has been described in connection with a case where the panoramic image generating unit 220 generates the panoramic image for display 82 by using the generation memory and the display memory. However, the present example is not limited thereto. For example, when the panoramic image generating unit 220 has only the display memory, the panoramic image generating unit 220 performs processing in the following manner. That is, when recording the pixel values in the display memory, the panoramic image generating unit 220 records the pixel values in the display memory after changing recording positions of the pixel values such that an area to be located at the center of the panoramic image for display 82 is changed according to the status of the vehicle 10. Examples of the status of the vehicle 10 include a status of a steering wheel, a status of a pedal, a status of objects around the vehicle, etc.

System Configuration

Moreover, among each processing described in the present embodiment, all or part of the processing, which have been described to be automatically performed, may be performed in manual, or all or part of the processing, which have been described to be performed in manual, may be automatically performed. In the example illustrated in FIG. 14, processing of sending the synthesis table 130a generated by the synthesis table generating apparatus 100 may be performed in manual using a portable memory by the user. Besides, processing procedure, control procedure, specific names, and information including various kinds of data and parameters described in the document or drawings may be arbitrarily changed, except when specifically mentioned. In the example illustrated in FIG. 15, the synthesis table 130a may further store "blend rates" which represent weighting factors depending on the pixel positions, for each of the cameras 20 to 23.

Moreover, since each component of each apparatus illustrated in the drawings represents a functional concept, it needs not have the same physical configuration as in the drawings. That is, specific forms of dispersion and integration of each apparatus are not limited to ones illustrated in the drawings, all or part thereof are configured to be functionally or physically dispersed or integrated in an arbitrary unit according to various loads or usage status. For example, in the example illustrated in FIG. 14, an image display unit 230 as an external device is connected to the vehicle periphery monitoring apparatus 200.

Computer

Figure 28:
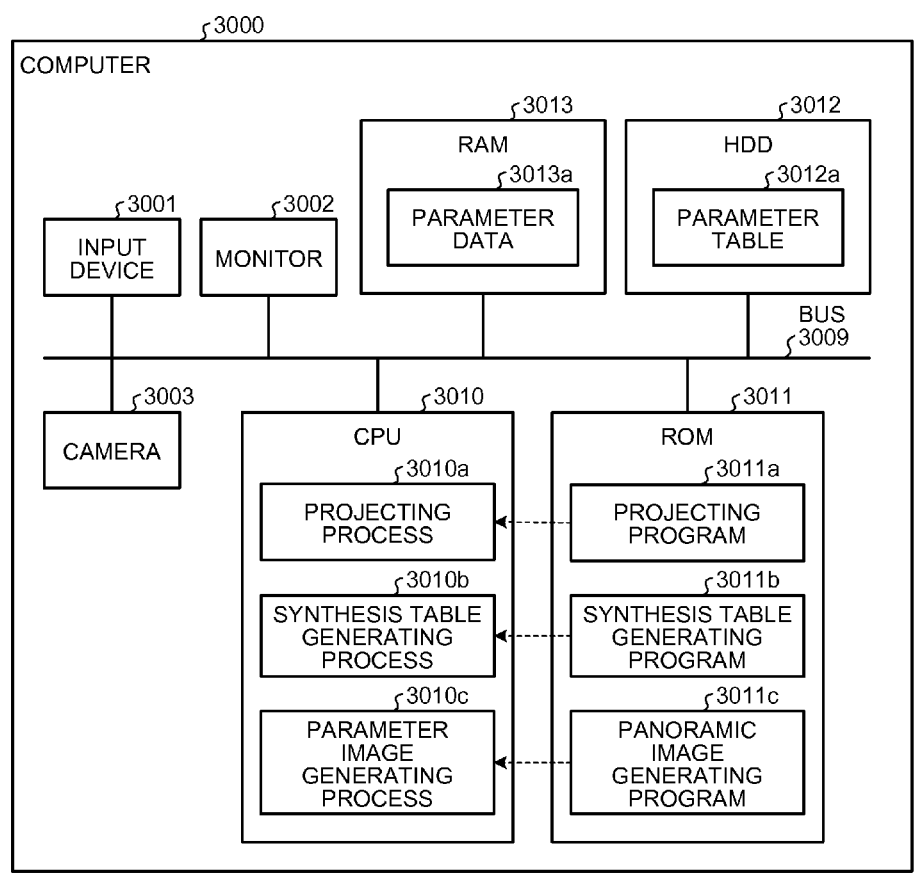
FIG. 28 is a diagram illustrating a hardware configuration of a computer that constitutes the image generating apparatus according to Second Embodiment.
Figure 29:
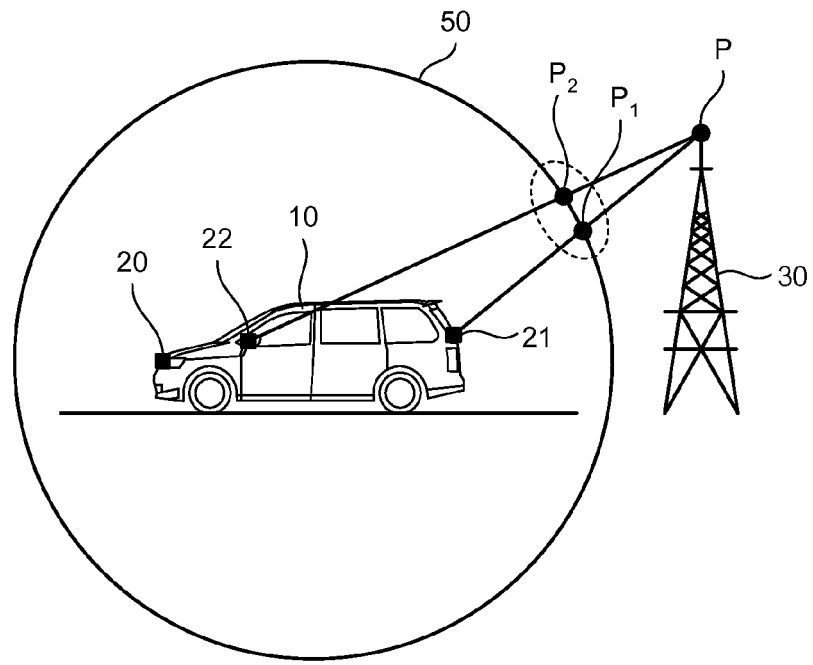
FIG. 29 is a diagram to describe a problem of a related art.
Figure 30:
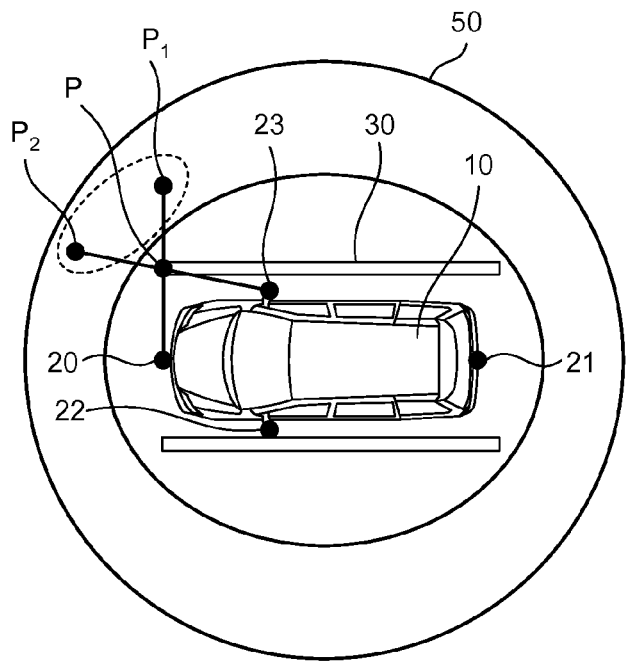
FIG. 30 is a diagram to describe a problem of the related art.

Moreover, various processing described in the examples described above may be achieved in a manner that a personal computer or a workstation executes a prepared program. Accordingly, hereinbelow, an example of a computer to execute an image generating program having the same functions as Second Embodiment is described referring to FIG. 28. FIG. 28 is a diagram to describe an example of the computer to execute the image generating program according to Second Embodiment. Since a computer to execute an image generating program having the same functions as Third Embodiment described above is the same as in FIG. 28, the description thereof is not repeated.

As illustrated in FIG. 28, a computer 3000 in Second Embodiment includes an input device 3001, a monitor 3002, a camera 3003, a CPU 3010, a ROM 3011, an Hard Disk Drive (HDD) 3012, and a Random Access Memory (RAM) 3013. Moreover, the computer 3000 is connected to the above components ranging from the input device 3001 to the RAM 3013 via a bus 3009 or the like.

The ROM 3011 stores a control program to perform the same functions as the projecting unit 120, the synthesis table generating unit 130, and the panoramic image generating unit 220 in Second Embodiment described above. In other words, as illustrated in FIG. 28, a projecting program 3011a, a synthesis table generating program 3011b, and a panoramic image generating program 3011c are stored in the ROM 3011 beforehand. These programs 3011a to 3011c may be suitably integrated or divided like each component of the configurations of the synthesis table generating apparatus 100 and the vehicle periphery monitoring apparatus 200 illustrated in FIG. 14.

The CPU 3010 reads the programs 3011a to 3011c out of the ROM 3011 and executes them. As a result, as illustrated in FIG. 28, processes 3010a to 3010c function as a projecting process 3010a, a synthesis table generating process 3010b, and a panoramic image generating process 3010c, respectively. The processes 3010a to 3010c correspond to the projecting unit 120, the synthesis table generating unit 130, and the panoramic image generating unit 220 illustrated in FIG. 14, respectively. Moreover, as for each processing unit virtually implemented on the CPU 3010, all the processing units need not operate on the CPU 3010 all the time, and only partial processing units for processing may be virtually implemented.

A parameter table 3012a is provided in the HDD 3012. The parameter table 3012a corresponds to the parameter storage unit 110 illustrated in FIG. 14.

The CPU 3010 reads the parameter table 3012a and loads it in the RAM 3013. The CPU 3010 executes the image generating program by using parameter data 3013a stored in the RAM 3013. All the data stored the RAM 3013 need not be loaded in the RAM 3013, but only part of the data necessary for the processing may be loaded in the RAM 3013.

Others

The image generating program described in the example can be distributed through a network such as the Internet. Moreover, since it is recorded in recording medium that can be read with computers such as hard disk, flexible disk (FD), CD-ROM, MO, and DVD, and it is read from recording medium by the computer, the image generating program can be executed.

According to one aspect of the technology disclosed in the present application, there is an advantage of being able to generate a panoramic image that gives a sense of less unnaturalness to the user.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image generating apparatus comprising:
a processor; and
a memory, wherein the processor executes:
receiving a plurality of camera images captured by each of a plurality of cameras having a common subject;
generating a virtual spherical screen whose center is set to a position corresponding to an eye line of a driver of a vehicle to which the plurality of cameras is mounted and calculating a z-component of a unit direction vector of a segment connecting the center of the spherical screen and a position of a subject captured in each of the camera images;
projecting, within each of the camera images received at the receiving, an image for which the calculated z-component is negative and which is present below a predetermined horizontal line within each of the camera images on a planar bottom surface of an infinite hemisphere having the planar bottom surface, and an image for which the calculated z-component is positive and which is present above the horizontal line within each of the camera images on a hemispherical surface of the infinite hemisphere; and generating a panoramic image including a common area of the camera images by using the images projected on the hemispherical surface and the planar bottom surface of the infinite hemisphere having the planar bottom surface at the projecting.

2. The image generating apparatus according to claim 1, wherein the generating includes generating the panoramic image such that a camera image captured by a certain camera is located at a center of the panoramic image according to a status of the vehicle to which the plurality of cameras is mounted.

3. A synthesis table generating apparatus comprising:
a processor; and
a memory, wherein the processor executes:

generating a virtual spherical screen whose center is set to a position corresponding to an eye line of a driver of a vehicle to which the plurality of cameras is mounted and calculating a z-component of a unit direction vector of a segment connecting the center of the spherical screen and a position of a subject captured in each of the camera images;

projecting, among pixels included in the camera images captured by the plurality of cameras having a common subject, position information of a certain pixel for which the calculated z-component is negative and which is present below a predetermined horizontal line within each of the camera images on a planar bottom surface of an infinite hemisphere having the planar bottom surface, and position information of a certain pixel for which the calculated z-component is positive and which is present above the horizontal line on a hemispherical surface of the infinite hemisphere; and generating a synthesis table showing a correspondence relation between position information of each pixel included in a panoramic image generated from the plurality of camera images including a common area of the camera images and position information of each pixel included in the camera images, by using a result of the projection of the images on the hemispherical surface and the planar bottom surface of the infinite hemisphere having the planar bottom surface at the projecting.

4. A non-transitory computer readable storage medium storing therein an image generating program causing a computer to execute:

receiving a plurality of camera images captured by each of a plurality of cameras having a common subject;

generating a virtual spherical screen whose center is set to a position corresponding to an eye line of a driver of a vehicle to which the plurality of cameras is mounted and calculating a z-component of a unit direction vector of a segment connecting the center of the spherical screen and a position of a subject captured in each of the camera images;

projecting, within each of the camera images received at the receiving, an image for which the calculated z-component is negative and which is present below a predetermined horizontal line within each of the camera images on a planar bottom surface of an infinite hemisphere having the planar bottom surface, and an image for which the calculated z-component is positive and which is present above the horizontal line within each of the camera images on a hemispherical surface of the infinite hemisphere; and generating a panoramic image including a common area of the camera images by using the images projected on the hemispherical surface and the planar bottom surface of the infinite hemisphere having the planar bottom surface at the projecting.

5. The non-transitory computer readable storage medium according to claim 4 wherein, the generating includes generating the panoramic image such that a camera image captured by a certain camera is located at a center of the panoramic image according to a status of the vehicle to which the plurality of camera is mounted.

* * * * *